US011743685B2

(12) United States Patent
Buck, Jr. et al.

(10) Patent No.: US 11,743,685 B2
(45) Date of Patent: *Aug. 29, 2023

(54) SYSTEMS AND METHODS FOR MONITORING SYSTEM EQUIPMENT DIAGNOSIS

(71) Applicant: BI Incorporated, Boulder, CO (US)

(72) Inventors: James J. Buck, Jr., Longmont, CO (US); Joseph P. Newell, Louisville, CO (US); Dustin Pettit, Boulder, CO (US); Mike Cooke, Boulder, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/723,067

(22) Filed: Apr. 18, 2022

(65) Prior Publication Data

US 2022/0240049 A1    Jul. 28, 2022

Related U.S. Application Data

(63) Continuation of application No. 17/116,611, filed on Dec. 9, 2020, now Pat. No. 11,337,032, which is a continuation of application No. 16/404,516, filed on May 6, 2019, now Pat. No. 10,893,383.

(51) Int. Cl.
*H04W 4/02* (2018.01)
*G08B 21/02* (2006.01)
*H04W 4/029* (2018.01)
*G08B 21/22* (2006.01)
*G08B 29/04* (2006.01)

(52) U.S. Cl.
CPC ........ *H04W 4/027* (2013.01); *G08B 21/0283* (2013.01); *G08B 21/22* (2013.01); *G08B 29/046* (2013.01); *H04W 4/023* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 6,100,806 | A | 8/2000 | Gaukel |
| 7,930,927 | B2 | 4/2011 | Cooper et al. |
| 8,493,219 | B2 | 7/2013 | Buck et al. |
| 8,576,065 | B2 | 11/2013 | Buck et al. |
| 8,629,776 | B2 | 1/2014 | Buck et al. |
| 8,657,744 | B2 | 2/2014 | Rompa et al. |
| 9,240,118 | B2 | 1/2016 | Melton et al. |
| 9,241,659 | B2 | 1/2016 | Rompa et al. |
| 9,355,548 | B2 | 5/2016 | Buck et al. |
| 9,355,579 | B2 | 5/2016 | Buck et al. |
| 9,423,487 | B2 | 8/2016 | Buck et al. |
| 9,480,431 | B2 | 11/2016 | Melton et al. |
| 9,569,952 | B2 | 2/2017 | Buck et al. |
| 9,626,855 | B2 | 4/2017 | Melton et al. |

(Continued)

*Primary Examiner* — Adolf Dsouza
(74) *Attorney, Agent, or Firm* — HDC Intellectual Property Law, LLP

(57) ABSTRACT

Various systems, methods, and/or devices are discussed for diagnosing monitoring system equipment functionality. In some cases methods are discussed that include, inter alia, receiving test results and sending test commands to/from monitor devices. The results are analyzed to determine an operation status. In various cases systems for determining operation status are discussed that include at least two monitor devices. The monitor devices are configured to execute test commands and to provide corresponding results. The results are analyzed to determine an operation status.

20 Claims, 9 Drawing Sheets

(56) References Cited

U.S. PATENT DOCUMENTS

| | | | |
|---|---|---|---|
| 9,629,420 | B2 | 4/2017 | Cooper et al. |
| 9,668,095 | B1 | 5/2017 | Newell et al. |
| 10,068,462 | B2 | 3/2018 | Buck et al. |
| 10,077,261 | B2 | 9/2018 | Connolly et al. |
| 2003/0222781 | A1 | 12/2003 | Defant et al. |
| 2005/0040944 | A1 | 2/2005 | Contestable |
| 2007/0014264 | A1 | 1/2007 | Davis |
| 2007/0285258 | A1 | 12/2007 | Hartman |
| 2008/0012760 | A1 | 1/2008 | Derrick |
| 2008/0048459 | A1 | 1/2008 | Derrick |
| 2011/0154887 | A1 | 6/2011 | Cooper et al. |
| 2011/0199205 | A1 | 8/2011 | Kremi |
| 2011/0395722 | | 8/2011 | Walter et al. |
| 2011/0237726 | A1 | 9/2011 | Dhuna |
| 2013/0328678 | A1 | 12/2013 | Shechtner |
| 2014/0039804 | A1 | 2/2014 | Park |
| 2014/0179342 | A1 | 6/2014 | Hamerly |
| 2015/0356261 | A1 | 12/2015 | Brust |
| 2016/0154643 | A1 | 6/2016 | Zhang |
| 2016/0301581 | A1 | 10/2016 | Carter |
| 2017/0134249 | A1 | 5/2017 | Laing |
| 2017/0303090 | A1 | 10/2017 | Stitt |
| 2017/0307388 | A1 | 10/2017 | McConathy |
| 2019/0204099 | A1 | 7/2019 | Buck et al. |
| 2019/0204903 | A1 | 7/2019 | Buck et al. |
| 2019/0206221 | A1 | 7/2019 | Buck et al. |
| 2019/0206229 | A1 | 7/2019 | Buck et al. |
| 2019/0208355 | A1 | 7/2019 | Buck et al. |
| 2019/2026222 | | 7/2019 | Buck et al. |

SYSTEMS AND METHODS FOR MONITORING SYSTEM EQUIPMENT DIAGNOSIS

CROSS REFERENCE TO RELATED APPLICATIONS

The present application is a continuation application of U.S. patent application Ser. No. 17/116,611 entitled "Systems and Methods for Monitoring System Equipment Diagnosis" and filed Dec. 9, 2020 by Buck et al.; which in turn is a continuation of U.S. Pat. No. 10,893,383 entitled "Systems and Methods for Monitoring System Equipment Diagnosis" and issued on Jan. 12, 2021. The entirety of the aforementioned applications is incorporated herein by reference for all purposes.

BACKGROUND OF THE INVENTION

Various embodiments provide systems and methods for diagnosing monitoring system equipment functionality.

Large numbers of individuals are currently monitored as part of parole requirements or other requirements. Such monitoring allows a monitoring agency to determine whether the individual is engaging in acceptable patterns of behavior, and where an unacceptable behavior is identified to stop such behavior going forward. In many monitoring systems, failure of one or more elements of the monitoring system limits the ability to discern individual behavior.

Thus, for at least the aforementioned reasons, there exists a need in the art for more advanced approaches, devices and systems for monitoring.

BRIEF SUMMARY OF THE INVENTION

Various embodiments provide systems and methods for diagnosing monitoring system equipment functionality.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1A:
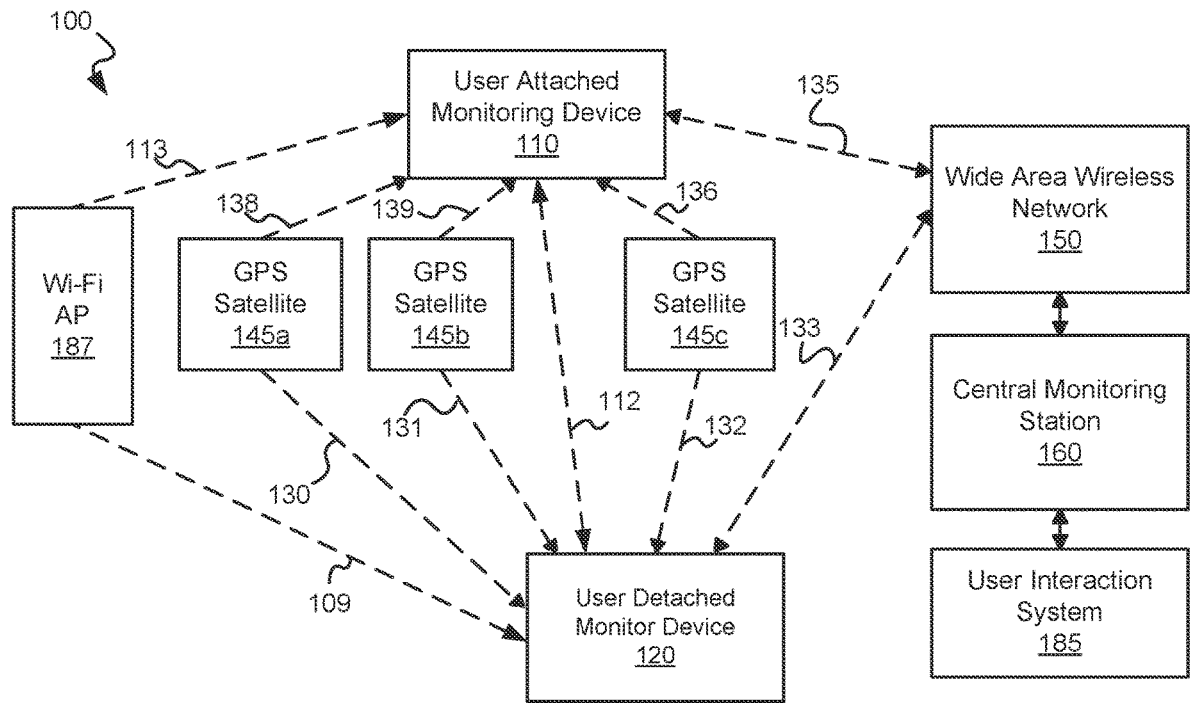
FIG. 1a is a block diagram illustrating a hybrid monitoring system including both a user attached monitor device and a user detached monitor device in accordance with various embodiments.

Various embodiments provide systems and methods for diagnosing monitoring system equipment functionality.

It has been found that returning offenders to society after being locked up in a secure facility with little if any control of their day to day activities is often unsuccessful. It is often helpful to have, for example, a parole officer monitor their movements and activities for a period of time as they reenter society. In some cases, the parole officer is aided by a tracking device attached to the individual being monitored. However, this is costly as a parole officer must be significantly involved in monitoring and responding to situations. Some embodiments disclosed herein reduce the interaction between the tracking device and the parole officer.

Further, it has been found that once a monitoring term has been completed and a monitored individual has been fully released into society without oversight, the chances that the individual will re-engage in problematic behavior is high. Various embodiments disclosed herein provide tools and devices that continue to support the individual as they transition away from the active oversight by, for example, a parole officer.

Various embodiments provide methods for determining operation status of a monitoring system. Such methods include: providing a first test command to a user attached monitor device where the user attached monitor device is physically attached to an individual being monitored; providing a second test command to a user detached monitor device where the user detached monitor device is associated with the individual being monitored; receiving a first test result corresponding to the first test command from the user attached monitor device; receiving a second test result corresponding to the second test command from the user detached monitor device; and analyzing a combination of the first test result and the second test result to determine an operation status of at least one of the user attached monitor device and the user detached monitor device.

In some instances of the aforementioned embodiments, the methods further include: providing the user attached monitor device, and providing the user detached monitor device. The user attached monitor device includes, but is not limited to, location determination functionality, motion determination functionality, and a strap for attaching the user attached monitor device to the individual, the user detached monitor device includes, but is not limited to: location determination functionality, and motion determination functionality. In some cases, the user detached monitor device is a cellular telephone.

In various instances of the aforementioned embodiments, the analysis is performed by a central monitoring station. In such instances, the methods may further include reporting an analysis result derived from analyzing the combination of the first test result and the second test result. The analysis result is reported from the central monitoring station to a person (e.g., a technician or a person assigned to monitor the individual). In one or more instances of the aforementioned embodiments, the analyzing is performed by the user detached monitor device. In such instances, the methods may further include reporting an analysis result derived from analyzing the combination of the first test result and the second test result. The analysis result is reported from the user detached monitor device to a person (e.g., a technician or a person assigned to monitor the individual) via the central monitoring station.

In some instances of the aforementioned embodiments, the first test command commands the user attached monitor device to determine location of the user attached monitor device, and the second test command commands the user detached monitor device to determine location of the user detached monitor device. The first test result is a location of the user attached monitor device, or a location unavailable message; and the second test result is a location of the user detached monitor device, or a location unavailable message. The methods further include analyzing the combination of the first test result and the second test result utilizing both the first test result and the second test result to determine an analysis result. The analysis result indicates: a user attached location test fail, a user detached location test fail, a location test indefinite, a user attached location test pass, or a user detached location test pass. In some cases, the user attached monitor device determines the location of the user attached monitor device using wireless satellite signals and the user detached monitor device determines the location of the user detached monitor device using wireless satellite signals. In various cases, the user attached monitor device determines the location of the user attached monitor device using wireless signals from one or more WiFi access points and the user detached monitor device determines the location of the user detached monitor device using wireless signals from one or more WiFi access points.

In various instances of the aforementioned embodiments, the first test command commands the user attached monitor device to identify WiFi access points visible to the user attached monitor device, and the second test command commands the user detached monitor device to identify WiFi access points visible to the user detached monitor device. The first test result is the list of the of WiFi access points visible to the user attached monitor device, and the second test result is the list of the of WiFi access points visible to the user detached monitor device. Analyzing the combination of the first test result and the second test result includes comparing the list of WiFi access points visible to the user attached monitor device to the list of WiFi access points visible to the user detached monitor device to determine that both the user attached monitor device and the user detached monitor device are seeing a common subset of the list of WiFi access points visible to the user attached monitor device and the list of WiFi access points visible to the user detached monitor device.

In some instances of the aforementioned embodiments, the first test command commands the user attached monitor device to determine motion of the user attached monitor device, and the second test command commands the user detached monitor device to determine motion of the user detached monitor device. The first test result may be a motion indication, a no motion indication, a plurality of motion indications, a plurality of no motion indications, or a combination of motion indications and no motion indication. The second test result may be a motion indication, a no motion indication, a plurality of motion indications, a plurality of no motion indications, or a combination of motion indications and no motion indication. Analyzing the combination of the first test result and the second test result includes comparing the second test result with the first test result.

In various instances of the aforementioned embodiments, the first test command commands the user attached monitor device to determine motion of the user attached monitor device, and the second test command commands the user detached monitor device to determine motion of the user attached monitor device. The first test result includes a first list of time stamped indications obtained over a first period of time by the user attached monitor device. The list of time stamped indications includes: at least one motion indication, at least one no motion indication, or a combination of at least one motion indication and at least one no motion indication. The second test result includes a first list of time stamped indications obtained over a first period of time by the user attached monitor device. Again, the list of time stamped indications includes: at least one motion indication, at least one no motion indication, or a combination of at least one motion indication and at least one no motion indication. Analyzing the combination of the first test result and the second test result includes comparing at least one entry in the first test result with at least one entry in the second test result where the at least one entry in the first test result corresponds to a time stamp indicating a time similar to a time stamp corresponding to the at least one entry in the second test result.

Other embodiments provide systems for determining operation status of a monitoring system. The systems include a central monitoring station having a processor and a computer readable medium. The computer readable medium including instructions executable by the processor to: provide a first test command to a user attached monitor device, wherein the user attached monitor device is physically attached to an individual being monitored; provide a second test command to a user detached monitor device, wherein the user detached monitor device is associated with the individual being monitored; receive a first test result corresponding to the first test command from the user attached monitor device; receive a second test result corresponding to the second test command from the user detached monitor device; and analyze a combination of the first test result and the second test result to determine an operation status of at least one of the user attached monitor device and the user detached monitor device.

In some instances of the aforementioned embodiments, the computer readable medium further includes instructions executable by the processor to provide the user attached monitor device. The user attached monitor device includes: location determination functionality, motion determination functionality, and a strap for attaching the user attached monitor device to the individual. In various instances of the aforementioned embodiments, the computer readable medium further includes instructions executable by the processor to provide the user detached monitor device. The user detached monitor device includes: location determination functionality, and motion determination functionality. In one or more instances of the aforementioned embodiments, the user detached monitor device is a cellular telephone.

Turning to FIG. 1a, a block diagram illustrates a hybrid monitoring system 100 including both a user attached monitor device 110 and a user detached monitor device 120 in accordance with various embodiments. A local communication link 112 allows for communication between user attached monitor device 110 and user detached monitor device 120. Local communication link 112 may be any communication link that is capable of transferring information or otherwise communicating between two devices within a relatively short distance of each other. In some cases, for example, local communication link 112 may be a Bluetooth™ communication link. In other examples, local communication link 112 may be a line of sight infrared communication link. As yet other examples, local communication link 112 may be a WiFi communication link. Based upon the disclosure provided herein, one of ordinary skill in the art will recognize a variety of communication protocols and/or media that may be used to implement local communication link 112.

User detached monitor device 120 is portable, and may be any device that is recognized as being used by or assigned to an individual being monitored, but is not physically attached to the individual being monitored by a tamper evident attaching device. User detached monitor device 120 may be, but is not limited to, a cellular telephone capable of communication with user attached monitor device 110 via local communication link 112. In contrast, user attached monitor device 110 is attached to the individual being monitored using a tamper evident attaching device like a strap. User attached monitor device 110 may be, but is not limited to, a tracking device that is attached around the limb of an individual and includes indicators to monitor whether the device has been removed from the individual or otherwise tampered. Hybrid monitoring system 100 further includes a central monitoring station 160 wirelessly coupled to user attached monitor device 110 and user detached monitor device 120 via one or more wide area wireless (e.g., cellular telephone network, Internet via a Wi-Fi access point, or the like) communication networks 150.

User detached monitor device 120 includes a location sensor that senses the location of the device and generates a location data. For example, when user detached monitor device 120 is capable of receiving wireless global navigation satellite system (hereinafter "GNSS") location information 130, 131, 132 from a sufficient number of GPS or GNSS satellites 145 respectively, user detached monitor device 120 may use the received wireless GNSS location information to calculate or otherwise determine the location of user attached monitor device 110. Global positioning system (hereinafter "GPS") is one example of a GNSS location system. While GPS is used in the specific embodiments discussed herein, it is recognized that GPS may be replaced by any type of GNSS system. In some instances, this location includes latitude, longitude, and elevation. It should be noted that other types of earth-based triangulation may be used in accordance with different embodiments of the present invention. For example, other cell phone based triangulation, UHF band triangulation such as, for example, long range (hereinafter "LoRa") triangulation signals. Based on the disclosure provided herein, one of ordinary skill in the art will recognize other types of earth-based triangulation that may be used. The location data may comprise one or more of, but is not limited to: global positioning system ("GPS") data, Assisted GPS ("A-GPS") data, Advanced Forward Link Trilateration ("AFLT") data, and/or cell tower triangulation data. Where GPS is used, user detached monitor device 120 receives location information from three or more GPS satellites 145a, 145b, 145c via respective communication links 130, 131, 132. The aforementioned location data is utilized to verify the location of a user associated with user detached monitor device 120 at various points as more fully discussed below. User detached monitor device 120 is considered "ambiguous" because it is not attached to the user in a tamper resistant/evident way, but rather is freely severable from the user and thus could be used by persons other than the target. Various processes discussed herein mitigate the aforementioned ambiguity to yield a reasonable belief that information derived from user detached monitor device 120 corresponds to the target.

The location data and/or other data gathered by user detached monitor device 120 is wirelessly transmitted to central monitoring station 160 via wide area wireless network 150 accessed via a wireless link 133. Central monitoring station 160 may be any location, device or system where the location data is received, including by way of non-limiting example: a cellular/smart phone, an email account, a website, a network database, and a memory device. The location data is stored by central monitoring station 160 and is retrievable by a monitor, such as a parent, guardian, parole officer, court liaison, spouse, friend, or other authorized group or individual. In this manner, the monitor is able to respond appropriately to the detected out-of-bounds activity by a user. In some cases, the monitor is able to retrieve the location data via a user interaction system 185 which may be, but is not limited to, a network connected user interface device communicatively coupled via a network to central monitoring station 160 and/or directly to user detached monitor device 120 via wide area wireless network 150.

User detached monitor device 120 may further include a user identification sensor operable to generate user identification data for identifying the user in association with the generation of the location data. The user identification data may comprise one or more of: image data, video data, biometric data (e.g. fingerprint. DNA, retinal scan, etc. data), or any other type of data that may be used to verify the identity of the user at or near the time the location data is generated. And the user identification sensor may comprise one or more of: a camera, microphone, heat sensor, biometric data sensor, or any other type of device capable of sensing/generating the aforementioned types of user identification data.

The user identification data is wirelessly transmitted in association with the location data to central monitoring station 160 via a wireless transmitter communicatively coupled to the user identification sensor. The user identification data is stored in association with the location data by central monitoring station 160 and is retrievable therefrom by a monitor, such as a parent, guardian, parole officer, court liaison, spouse, friend, or other authorized group or individual. Preferably, the monitor is able to retrieve the location data via a network connected user interface device communicatively coupled—via the network—to central monitoring station 160 and/or to user detached monitor device 120. The location data may be transmitted to central monitoring station 160 independent of the user identification data, for example, during a periodic check-in with central monitoring system 160.

User detached monitor device 120 may further comprise a memory communicatively coupled to a control unit—which is also communicatively coupled to the location sensor, the identification sensor and the wireless transceiver—for controlling the operations thereof in accordance with the functionalities described herein. The memory may include non-transient instructions (e.g., software of firmware-based based instructions) executable by the control unit to perform and/or enable various functions associated with user detached monitor device 120. As user detached monitor device 120 is portable, each of the components may be located within, immediately adjacent to, or exposed without, a device housing whose dimensions are such that user detached monitor device 120 as a whole may be discretely carried by the user, for example, within a pocket or small purse. User detached monitor device 120 may include a Wi-Fi transceiver capable of receiving information from one or more Wi-Fi access points 187 that can be used to discern location via a Wi-Fi communication link 109.

Central monitoring station 160 may include a server supported website, which may be supported by a server system comprising one or more physical servers, each having a processor, a memory, an operating system, input/output interfaces, and network interfaces, all known in the art, coupled to the network. The server supported website comprises one or more interactive web portals through which the monitor may monitor the location of the user in accordance with the described embodiments. In particular, the interactive web portals may enable the monitor to retrieve the location and user identification data of one or more users, set or modify 'check-in' schedules, and/or set or modify preferences. The interactive web portals are accessible via a personal computing device, such as for example, a home computer, laptop, tablet, and/or smart phone.

In some embodiments, the server supported website comprises a mobile website or mobile application accessible via a software application on a mobile device (e.g. smart phone). The mobile website may be a modified version of the server supported website with limited or additional capabilities suited for mobile location monitoring.

User attached monitor device 110 includes a location sensor that senses the location of the device and generates a location data. For example, when user attached monitor device 110 is capable of receiving wireless global navigation satellite system (hereinafter "GNSS") location information 136, 138, 139 from a sufficient number of GPS or GNSS satellites 145 respectively, user attached monitor device may use the received wireless GNSS location information to calculate or otherwise determine the location of human subject 110. Global positioning system (hereinafter "GPS") is one example of a GNSS location system. While GPS is used in the specific embodiments discussed herein, it is recognized that GPS may be replaced by any type of GNSS system. In some instances, this location includes latitude, longitude, and elevation. It should be noted that other types of earth-based triangulation may be used in accordance with different embodiments of the present invention. For example, other cell phone based triangulation, UHF band triangulation such as, for example, long range (hereinafter "LoRa") triangulation signals. Based on the disclosure provided herein, one of ordinary skill in the art will recognize other types of earth-based triangulation that may be used. The location data may comprise one or more of, but is not limited to: global positioning system ("GPS") data, Assisted GPS ("A-GPS") data, Advanced Forward Link Trilateration ("AFLT") data, and/or cell tower triangulation data. Where GPS is used, user attached monitor device 110 receives location information from three or more GPS or GNSS satellites 145 via respective communication links 136, 138, 139. The location data and/or other data gathered by user attached monitor device 110 is wirelessly transmitted to central monitoring station 160 via wide area wireless network 150 accessed via a wireless link 135. Again, central monitoring station 160 may be any location, device or system where the location data is received, including by way of non-limiting example: a cellular/smart phone, an email account, a website, a network database, and a memory device. The location data is stored by central monitoring station 160 and is retrievable by a monitor, such as a parent, guardian, parole officer, court liaison, spouse, friend, or other authorized group or individual. In this manner, monitor is able to respond appropriately to the detected out-of-bounds activity by a user.

User attached monitor device 110 may further comprise a memory communicatively coupled to a control unit—which is also communicatively coupled to the location sensor, the identification sensor and the wireless transceiver—for controlling the operations thereof in accordance with the functionalities described herein. The memory may include non-transient instructions (e.g., software of firmware-based based instructions) executable by the control unit to perform and/or enable various functions associated with user attached monitor device 110. User attached monitor device may include a strap which can be wrapped around a limb of the individual being monitored to secure user attached monitor device to the individual. The strap includes one or more tamper circuits and/or sensors that allow for a determination as to whether the device has been removed or otherwise tampered. Examples of a strap and tamper detection circuitry that may be used in relation to various embodiments discussed herein are described in U.S. Pat. No. 9,355,579 entitled "Methods for Image Based Tamper Detection", and filed by Buck et al. on Sep. 15, 2014; and US Pat. Pub. No. US 2017-0270778 A1 entitled "Systems and Methods for improved Monitor Attachment", and filed by Melton et al. on Mar. 21, 2016. Both of the aforementioned references are incorporated herein by reference for all purposes. Based upon the disclosure provided herein, one of ordinary skill in the art will recognize a variety of straps, tamper circuits, tamper devices, and/or attachment and tamper detection approaches that may be used in relation to various embodiments. User attached monitor device 110 may include a Wi-Fi transceiver capable of receiving information from one or more Wi-Fi access points 187 that may be used to identify location via a Wi-Fi communication link 113.

Figure 1B:
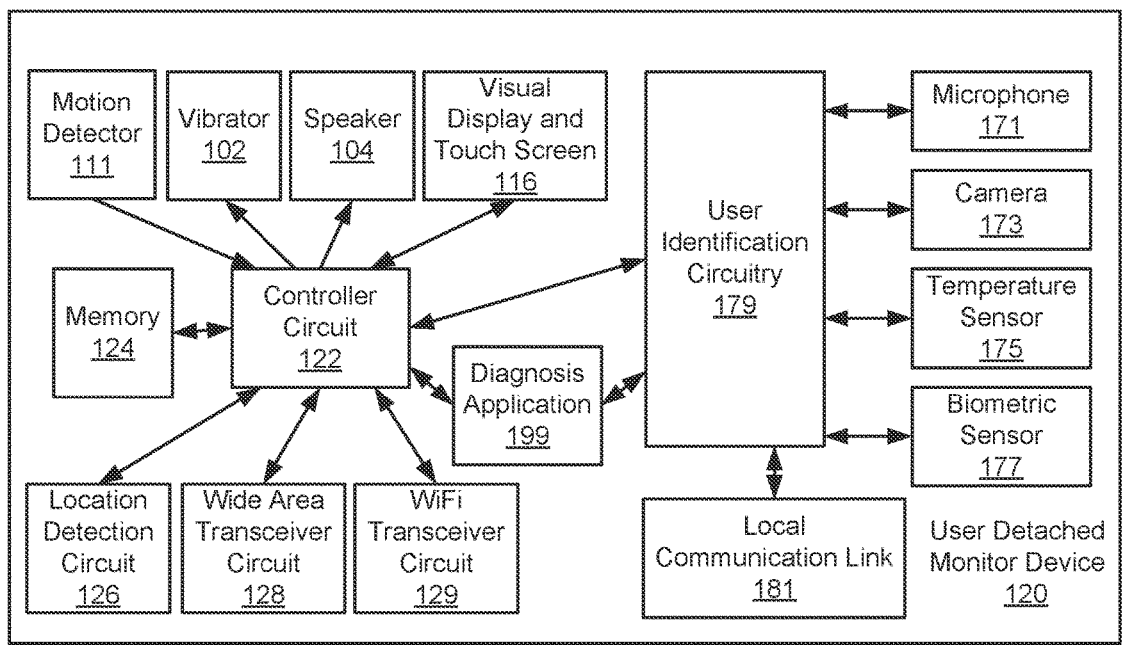
FIG. 1b is a block diagram of a user detached monitor device usable in accordance with one or more embodiments.

Turning to FIG. 1b, a block diagram of user detached monitor device 120 is shown in accordance with one or more embodiments. User detached monitor device 120 includes wireless transceiver circuitry 128 that is capable of sending and receiving information via wireless link 133 to/from wide area wireless network 150. Wireless transceiver circuitry 128 may be any circuitry, integrated circuit, and/or processor or controller capable of supporting wireless communication. Such wireless communication may include, but is not limited to, cellular telephone communication. Internet communication via a Wi-Fi access point, or both. In addition, user detached monitor device 120 includes a vibrator 112, a speaker 114, and a visual display and touch screen 116. In some cases, at scheduled times a user of user detached monitor device 120 is alerted of a need to check-in. The schedule of check-in times may be downloaded to a memory 124 by central monitoring station 160 via wireless link 133. The user may be alerted by one or more of: a visual prompt via visual display and touch screen 116, an audio prompt via speaker 114, and a tactile prompt via vibrator 112. Each of vibrator 112, speaker 114, and visual display and touch screen 116 is communicatively coupled to memory 124 and/or a control circuit 122 for controlling the operations thereof. In some cases, control circuit 122 includes a processor. In various cases, control circuit 122 is part of an integrated circuit. In one or more cases, memory 124 is included in an integrated circuit with control circuit 122. In various cases, memory 124 may include non-transient instructions (e.g., software or firmware-based based instructions) executable by controller circuit 122 to perform and/or enable various functions associated with user detached monitor device 120. A visual prompt may include, but is not limited to, text, images and/or a combination thereof, or a series of such visual prompts. An audio prompt may include, but is not limited to, one or more different audio prompts, or a series thereof. Each prompt may be stored in memory 124 and retrieved in accordance with the schedule that is also maintained in memory 124. In some embodiments, alerting the user involves a prompt that includes an e-mail or text message generated by central monitoring station 160 (e.g. the server supported website) and transmitted to the e-mail account or cellular phone number corresponding to user detached monitor device 120. In particular embodiments, such a prompt may include a 'post' on the user's 'wall,' 'feed,' or other social networking privilege. In some embodiments, the prompt may comprise an automated or live phone call to the user.

User detached monitor device 120 further includes user identification circuitry 179 capable of gathering user identification information from one or more of a microphone 171, a camera 173, a temperature sensor 175, and/or a biometric sensor 177. In some cases, user identification circuitry 179 is incorporated in an integrated circuit with control circuit 122. Microphone 171 is capable of accurately capturing the sound of a user's voice, camera 173 is capable of accurately capturing images including, for example, an image of the user's face, temperature sensor 175 is capable of accurately capturing an ambient temperature around user detached monitor device 120, and biometric sensor 177 is capable of accurately capturing biometric data about the user including, but not limited to, a thumb print, a retinal scan, or a breath-based alcohol measurement. Based upon the disclosure provided herein, one of ordinary skill in the art will recognize a variety of biometric data and corresponding sensors that may be used in relation to different embodiments. Under the direction of control circuitry 122, user identification circuitry 179 assembles one or more elements of data gathered by microphone 171, a camera 173, a temperature sensor 175, and/or a biometric sensor 177 into a user identification package which is forwarded to central monitoring station 160 via wireless transceiver circuitry 128. User detached monitor device 120 additionally includes a motion detector 111 operable to discern whether user detached monitor device is moving. In some cases, motion detector 120 includes an accelerometer circuit. Based upon the disclosure provided herein, one of ordinary skill in the art will recognize various circuits and/or sensors capable of indicating that user detached monitor device is moving that may be used in relation to different embodiments.

User detached monitor device 120 additionally includes location circuitry 126. Location circuitry 126 may include one or more of, a GPS processing circuit capable of fixing a location of user detached monitor device 120 using GPS data, a WiFi based location circuit capable of fixing a location of user detached monitor device 120 using contact information with one or more WiFi access points, and/or a cell tower triangulation processing circuit capable of fixing a location of user detached monitor device 120 using cell tower triangulation data. A local communication link 181 controls communication between user detached monitor device 120 and user attached monitor device 110. In some embodiments, local communication link 181 supports a Bluetooth™ communication protocol and is capable of both receiving information from user attached monitor device 110 and transmitting information to user attached monitor device 110. In other embodiments, local communication link 181 supports a Wi-Fi communication protocol and is capable of both receiving information from user attached monitor device 110 and transmitting information to user attached monitor device 110. In some cases, local communication link 181 supports communication in only a receive or transmit direction. Based upon the disclosure provided herein, one of ordinary skill in the art will recognize a variety of communication protocols and information transfer directions that may be supported by local communication link 181 in accordance with different embodiments. Additionally, user detached monitor device 120 includes a diagnosis application 199 that controls operation of one or more diagnostic tests designed to test the operational status of components of user detached monitor device 120 and/or user attached monitor device 110. Diagnosis application may be implemented in hardware, software, firmware-based, or some combination of the aforementioned. In some cases, diagnosis application provides control for user detached monitor device 120 of diagnostic processes described below in one or more of FIGS. 2-6.

Figure 1C:
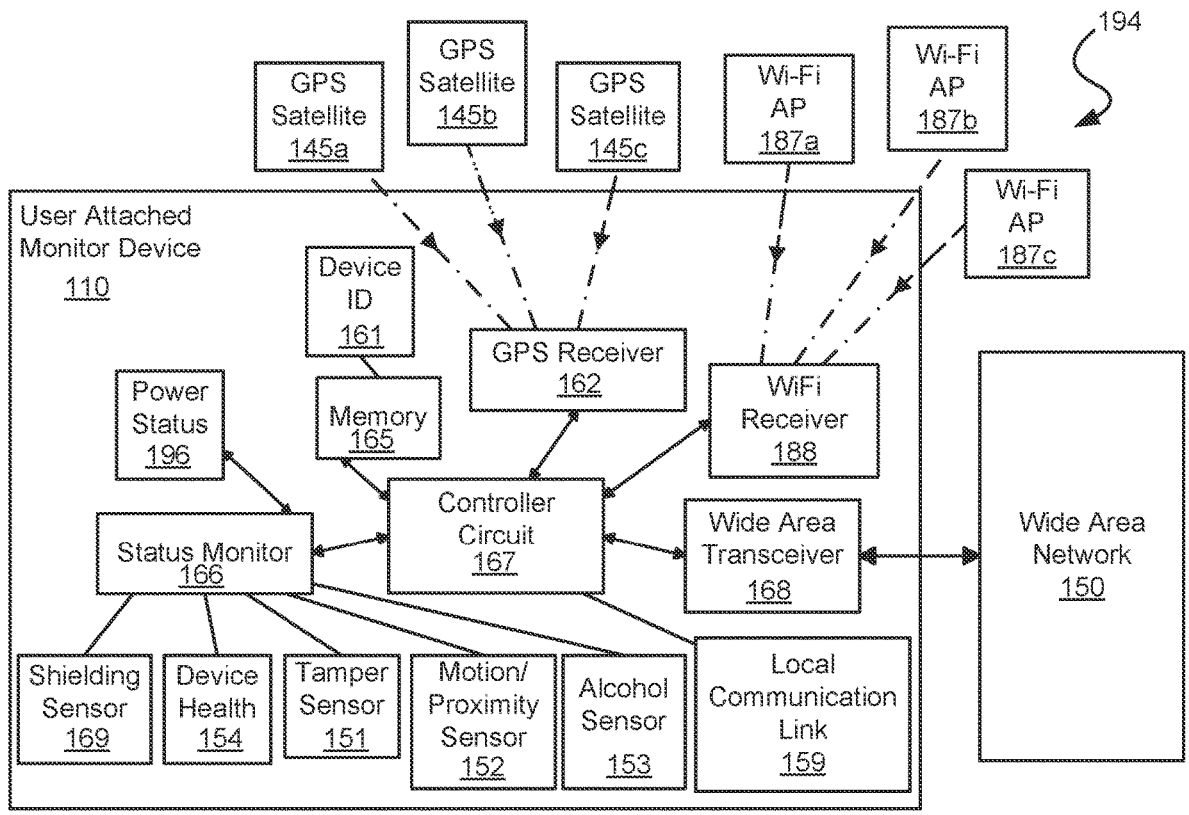
FIG. 1c is a block diagram of a user attached monitor device including a local communication link in accordance with some embodiments.

Turning to FIG. 1c, a block diagram 194 of user attached monitor device 110 including a local communication link 159 is shown in accordance with some embodiments. Local communication link 159 controls communication between user attached monitor device 110 and user detached monitor device 120. In some embodiments, local communication link 159 supports a Bluetooth™ communication protocol and is capable of both receiving information from user detached monitor device 120 and transmitting information to user detached monitor device 120. In other embodiments, local communication link 159 supports a Wi-Fi communication protocol and is capable of both receiving information from user detached monitor device 120 and transmitting information to user detached monitor device 120. In some cases, local communication link 159 supports communication in only a receive or transmit direction. Based upon the disclosure provided herein, one of ordinary skill in the art will recognize a variety of communication protocols and information transfer directions that may be supported by local communication link 159 in accordance with different embodiments.

As shown, user attached monitor device 110 includes a device ID 161 that may be maintained in a memory 165, and is thus accessible by a controller circuit 167. Controller circuit 167 is able to interact with a GPS receiver 162 and memory 165 at times for storing and generating records of successively determined GPS locations. Similarly, controller circuit 167 is able to interact with a Wi-Fi receiver 188 and memory 165 at times for storing and generating records of successively determined Wi-Fi access point identifications and signal strength. In some cases, memory 165 may include non-transient instructions (e.g., software of firmware-based based instructions) executable by controller circuit 167 to perform and/or enable various functions associated with user attached monitor device 110. As user attached monitor device 110 comes within range of one or more Wi-Fi access points (e.g., Wi-Fi access points 187), a Wi-Fi receiver 188 senses the signal provided by the respective Wi-Fi access points, and provides an identification of the respective Wi-Fi access point and a signal strength of the signal received from the Wi-Fi access point to Wi-Fi receiver 188. This information is provided to controller circuit 167 which stores the information to memory 165.

Where user attached monitor device 110 is operating in a standard mode, controller circuit 167 causes an update and reporting of the location of user attached monitor device 110 via a wide area transceiver 168 and wide area communication network 150. In some embodiments, wide area transceiver 168 is a cellular telephone transceiver. In some cases, the location data is time stamped. In contrast, where user attached monitor device 110 is within range of a public Wi-Fi access point, reporting the location of user attached monitor device 110 may be done via the public Wi-Fi access point in place of the cellular communication link. In another case where user attached monitor device 110 is operating in a low battery mode, reporting the location of user attached monitor device 110 may be done via user detached monitoring device 120 coupled using local communication link 159.

Which technologies are used to update the location of user attached monitor device 110 may be selected either by default, by programming from central monitor station 160, or based upon sensed scenarios with corresponding predetermined selections. For example, it may be determined whether sufficient battery power as reported by power status 196 remains in user attached monitor device 110 to support a particular position determination technology. Where insufficient power remains, the particular technology is disabled. In some cases, a maximum cost of resolving location may be set for user attached monitor device 110. For example, resolving Wi-Fi location data may incur a per transaction cost to have a third-party service provider resolve the location information. When a maximum number of resolution requests have been issued, the Wi-Fi position determination technology may be disabled. Further, it may be determined whether the likelihood that a particular position determination technology will be capable of providing meaningful location information. For example, where user attached monitor device 110 is moved indoors. GPS receiver 162 may be disabled to save power. Alternatively, where the tracking device is traveling at relatively high speeds, the Wi-Fi receiver 188 may be disabled. As yet another example, where cellular phone jamming is occurring, support for cell tower triangulation position determination may be disabled. As yet another example, where GPS jamming is occurring, GPS receiver 162 may be disabled. As yet another example, where user attached monitor device 110 is stationary, the lowest cost (from both a monetary and power standpoint) tracking may be enabled while all other technologies are disabled. Which position determination technologies are used may be based upon which zone a tracking device is located. Some zones may be rich in Wi-Fi access points and in such zones Wi-Fi technology may be used. Otherwise, another technology such as cell tower triangulation or GPS may be used. Based upon the disclosure provided herein, one of ordinary skill in the art will recognize other scenarios and corresponding combinations of technologies may be best.

Controller circuit 167 of user attached monitor device 110 at times functions in conjunction with wide area transceiver 168 to send and receive data and signals through wide area communication network 150. This link at times is useful for passing information and/or control signals between a central monitoring system (not shown) and user attached monitor device 110. The information transmitted may include, but is not limited to, location information, alcohol information, and information about the status of user attached monitor device 110. Based on the disclosure provided herein, one of ordinary skill in the art will recognize a variety of information that may be transferred via wide area communication network 150.

Various embodiments of user attached monitor device 110 include a variety of sensors capable of determining the status of user detached monitor device 120, and of the individual associated therewith. For example, a status monitor 166 may include one or more of the following subcomponents: power status sensor 196 capable of indicating a power status of user detached monitor device 120. The power status may be expressed, for example as a percentage of battery life remaining. Based upon the disclosure provided herein, one of ordinary skill in the art will recognize a variety of forms in which power status may be expressed. In addition, user attached monitor device 110 includes a set of shielding sensors 169 that are capable of determining whether user attached monitor device 110 is being shielded from receiving GPS signals and/or if GPS jamming is ongoing, a set of device health indicators 154, a tamper sensor 131 capable of determining whether unauthorized access to user attached monitor device 110 has occurred or whether user attached monitor device 110 has been removed from an associated individual being monitored, a motion/proximity sensor 152 capable of determining whether user attached monitor device 110 is moving and/or whether it is within proximity of an individual associated with user detached monitor device 120, and/or an alcohol sensor 153. Such an alcohol sensor may be any alcohol sensor capable of estimating an amount of alcohol in the individual being monitored. Based upon the disclosure provided herein, one of ordinary skill in the art will recognize a variety of alcohol sensors and corresponding alcohol sensing circuitry that may be used in relation to different embodiments. Based on the disclosure provided herein, one of ordinary skill in the art will recognize a variety of shielding sensors, a variety of device health transducers and indicators, a variety of tamper sensors, various different types of motion sensors, different proximity to human sensors, and various human body physical measurement sensors or transducers that may be incorporated into user attached monitor device 110 according to various different instances and/or embodiments.

Figure 1D:
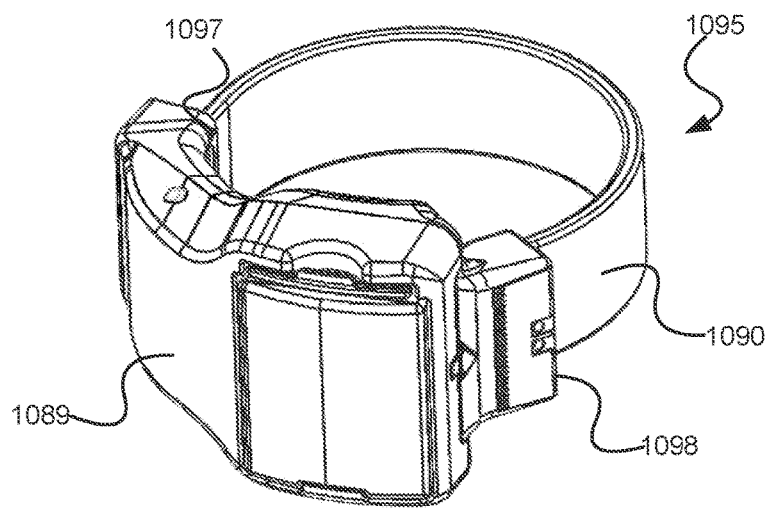
FIG. 1d shows a user attached monitor device with an attachment element for attaching the user attached monitor device to a limb of an individual in accordance with some embodiments.

Turning to FIG. 1d, a user attached monitor device 1089 is shown with an example attachment element 1090 connected at opposite ends of user attached monitor device 1089 (i.e., a first end 1097 and a second end 1098). Attachment element 1090 is operable to securely attach a tracking device 1095 (i.e., a combination of user attached monitor device 1089 and attachment element 1090) to a limb of an individual in accordance with some embodiments. In various embodiments, attachment element 1090 includes electrically and/or optically conductive material used to make a conductive connection form first end 1097 to second end 1098 through attachment element 1090 and is used in relation to determining whether user attached monitor device 1089 remains attached and/or has been tampered with. While FIG. 1d shows a strap as an example attachment element, based upon the disclosure provided herein, one of ordinary skill in the art will recognize other types of attachment elements that may be used in relation to different embodiments.

Figure 2:
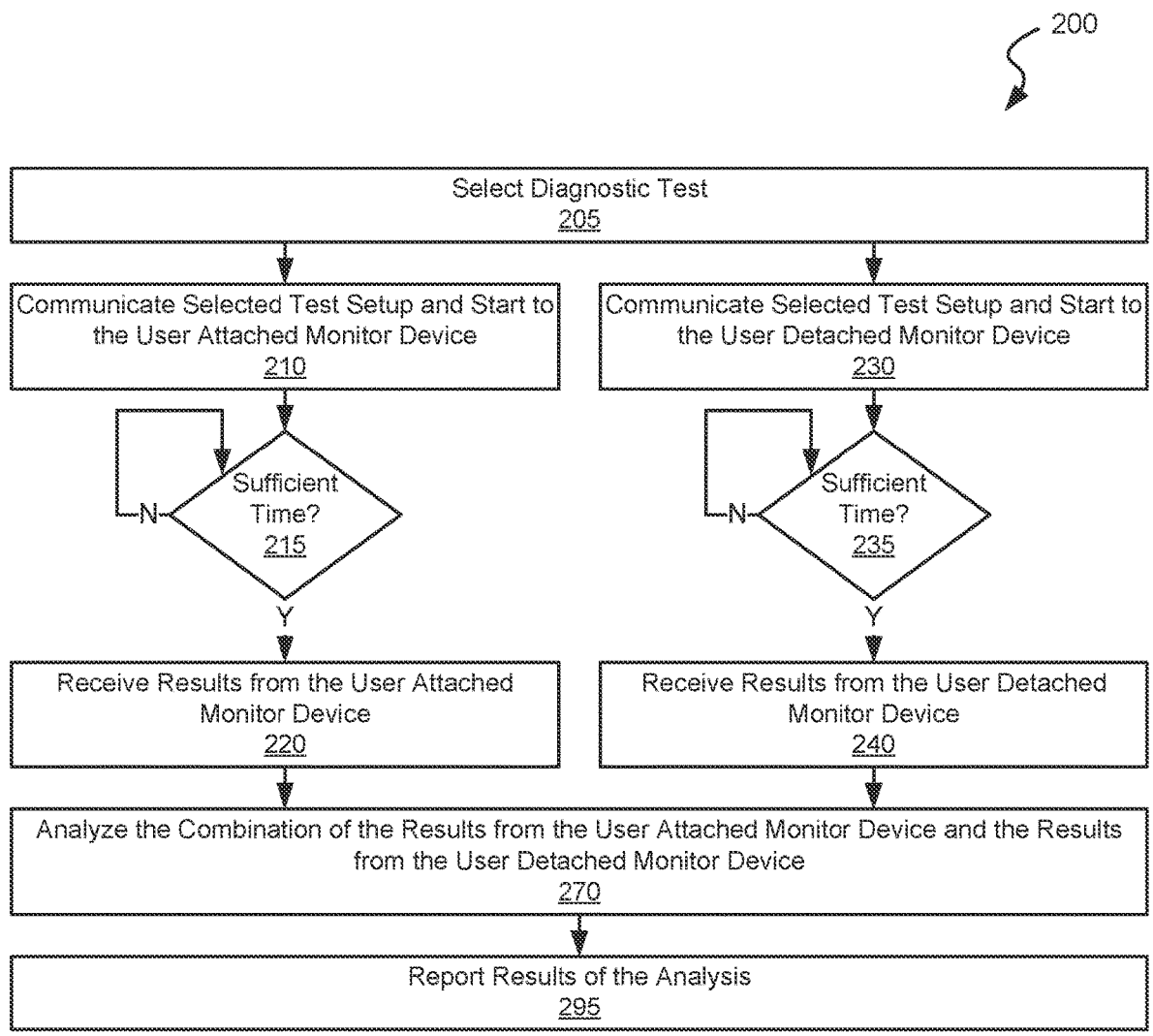
FIG. 2 is a flow diagram showing a method in accordance with some embodiments for using a combination of a user detached monitor device and a user attached monitor device to diagnose operational status of one or both of the user detached monitor device and/or the user attached monitor device.

Turning to FIG. 2, a flow diagram 200 shows a method in accordance with some embodiments for using a combination of user detached monitor device 120 and user attached monitor device 110 to diagnose operational status of one or both of user detached monitor device 120 and/or the user attached monitor device 110. Following flow diagram 200, a diagnostic test is identified as a selected diagnostic test (block 205). The selected diagnostic test may be designed to test one particular function of either or both of user detached monitor device 120 and/or user attached monitor device 110. For example, the selected diagnostic test may be designed to test whether a tamper indication received from tamper sensor 151 of user attached monitor device 110 is likely indicative of an actual tamper event or is spurious (i.e., a false alarm). As another example, the selected diagnostic test may be designed to test whether motion reported by motion/proximity sensor 152 of user attached monitor device 110 reflects similar motion being reported by motion detector 11 of user detached monitor device 120. As yet a further example, the selected diagnostic test may be designed to test whether location information provided from user attached monitor device 110 is reasonably similar to location information provided from user detached monitor device 120. As yet an additional example, the selected diagnostic test may be designed to test whether WiFi receiver 188 of user attached monitor device 110 is seeing a substantially similar set of WiFi access points 187 as those seen by wireless transceiver circuitry 128 of user detached monitor device 120. Based upon the disclosure provided herein, one of ordinary skill in the art will recognize other functionality of one or both of user attached monitor device 110 and user detached monitor device 120 that may be examined using the processes of FIG. 2. In some cases, the selected diagnostic test may be designed to test a number of functions of either or both of user detached monitor device 120 and/or user attached monitor device 110 in a single test.

A test setup for the selected diagnostic test is communicated to the user attached monitor device 110 (block 210). This may include, for example, transmitting one or more diagnostic test setup commands to user attached monitor device 110 where the commands are executable by controller circuit 167 to perform the selected diagnostic test. Where user detached monitor device 120 is the master in the diagnostic process, the test setup may be communicated to user attached monitor device 110 by user detached monitor device 120 under the direction of diagnosis application 199 via communication between local communication link 181 of user detached monitor device 120 and local communication link 159 of user attached monitor device 110. Alternatively, where central monitoring station 160 is the master in the diagnostic process, the test setup may be communicated to user attached monitor device 110 by central monitoring station via 160 wide area network 150 over either WiFi or cellular communication links.

A delay period is allowed to pass to give user attached monitor device 110 sufficient time to perform the selected test and gather results thereof (block 215). This delay period may, for example, be pre-selected for the selected diagnostic test or combination of diagnostic tests that are to be performed. Once the time period has passed (block 215), the results of the selected diagnostic test are received from user attached monitor device 110 (block 220). Where user detached monitor device 120 is the master in the diagnostic process, the results may be communicated to user detached monitor device 120 via communication between local communication link 181 of user detached monitor device 120 and local communication link 159 of user attached monitor device 110. Alternatively, where central monitoring station 160 is the master in the diagnostic process, the results may be communicated to central monitoring station 160 via wide area network 150 over either WiFi or cellular communication links.

In parallel to blocks 210-220, a test setup for the selected diagnostic test is communicated to the user detached monitor device 120 (block 230). This may include, for example, transmitting one or more diagnostic test setup commands to user detached monitor device 120. In some embodiments where central monitoring station 160 is the master in the diagnostic process, the commands communicated are limited to commands executable by controller circuit 122 to perform the selected diagnostic test. In other embodiments where user detached monitor device 120 is the master in the diagnostic process, the commands communicated include both commands executable by controller circuit 122 to perform the selected diagnostic test in relation to user detached monitor device 120, and commands to be communicated to user attached monitor device 110 under the direction of diagnosis application 199 via communication between local communication link 181 of user detached monitor device 120 and local communication link 159 of user attached monitor device 110. In such a case, such communicated commands are those discussed above in relation to block 210.

A delay period is allowed to pass to give user detached monitor device 120 sufficient time to perform the selected test and gather results thereof (block 235). This delay period may, for example, be pre-selected for the selected diagnostic test or combination of diagnostic tests that are to be performed. Once the time period has passed (block 235), the results of the selected diagnostic test are received from the user detached monitor device 120 (block 240). Where user detached monitor device 120 is the master in the diagnostic process, the results are received from a module (software, hardware, or combination thereof) within user detached monitor device 120. Alternatively, where central monitoring station 160 is the master in the diagnostic process, the results may be communicated to central monitoring station 160 via wide area network 150 over either WiFi or cellular communication links.

A combination of the results from the user attached monitor device 110 and user detached monitor device 120 is analyzed to determine operational status queried by the selected diagnostic test (block 270). This analysis is specific to the selected diagnostic and is designed to provide information on the operational status of one or more of the functions (hardware, software, or combination thereof) in one or both of user detached monitor device 120 and user attached monitor device 110. Where user detached monitor device 120 is the master in the diagnostic process, either user detached monitor device 120 or central monitor station 160 may perform the analysis. Where central monitor station 160 is providing the analysis and user detached monitor device 120 is the master in the diagnostic process, user detached monitor device 120 transmits the combination of the results from the user attached monitor device 110 and user detached monitor device 120 to the central monitor station 160 via wide area network 150. Alternatively, where central monitoring station 160 is the master in the diagnostic process, central monitor station 160 receives individual results from both of user detached monitor device 120 and user attached monitor device 110 and performs the analysis.

Ultimately, the results of the analysis are reported (block 295). Depending upon, for example, the urgency of the selected diagnostic test, reporting the results may be an immediate electronic message to a monitor (e.g., parole office charged with monitoring the individual to which the user attached monitor device is attached), or may result in recording the results in a database. Based upon the disclosure provided herein, one of ordinary skill in the art will recognize a variety of reporting processes, recipients, and/or storage locations for the results.

Figure 3A:
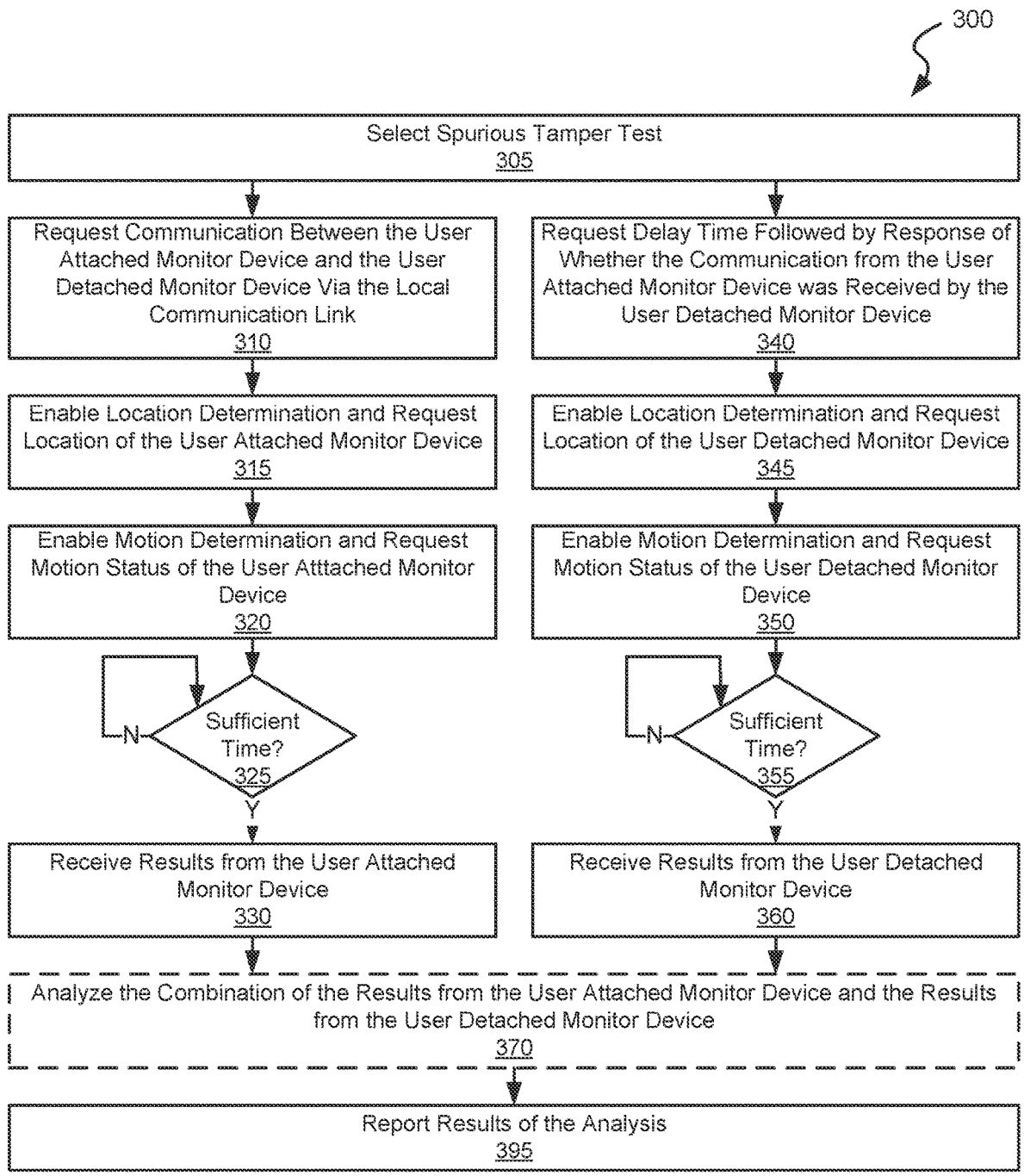
FIGS. 3a-3b are flow diagrams showing a method in accordance with some embodiments for using a combination of a user detached monitor device and a user attached monitor device to determine whether a tamper indication from the user attached monitor device is spurious.
Figure 3B:
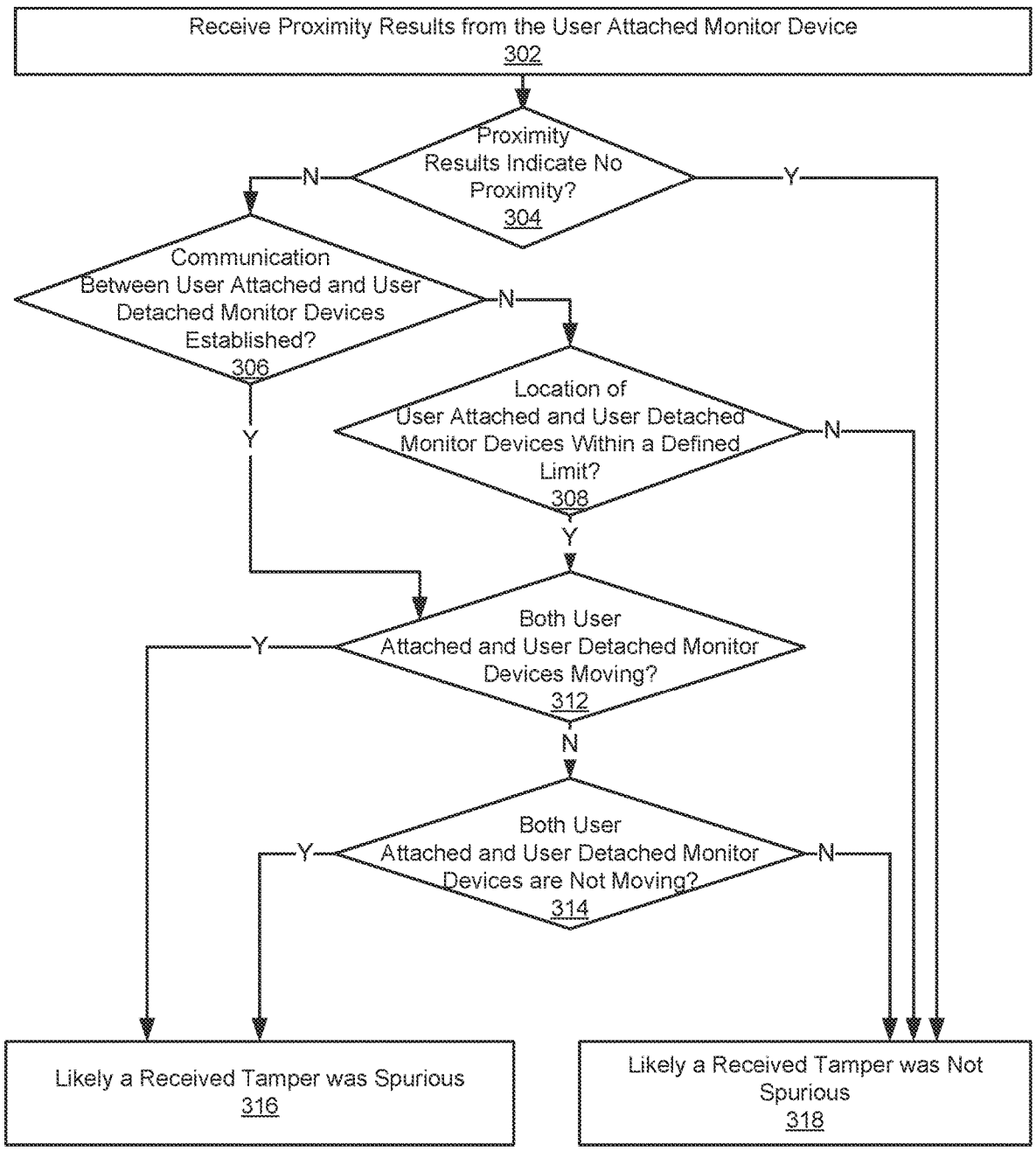

Turning to FIGS. 3*a*-3*b*, flow diagrams 300, 371 show a method in accordance with some embodiments for using a combination of user detached monitor device 120 and a user attached monitor device 110 to determine whether a tamper indication from tamper sensor 151 of user attached monitor device 110 is spurious. Following flow diagram 300, a spurious tamper test is identified as a selected diagnostic test (block 305). This selected diagnostic test is designed to test whether a tamper indication received from tamper sensor 151 of user attached monitor device 110 is likely indicative of an actual tamper event or is spurious (i.e., a false alarm).

A command to request communication between the user attached monitor device 110 and user detached monitor device 120 via local communication link 159 of user attached monitor device 110 and local communication link 181 of user detached monitor device 120 is sent to user attached monitor device (block 310). Where user detached monitor device 120 is the master in the diagnostic process, the command to communicate via local communication link 159 and local communication link 181 may be provided from user detached monitor device 120 via the same local communication links under the direction of diagnosis application 199. Alternatively, where central monitoring station 160 is the master in the diagnostic process, the command to communicate via local communication link 159 and local communication link 181 is communicated to user attached monitor device 110 by central monitoring station 160 via wide area network 150 over either WiFi or cellular communication links.

In addition, location determination circuitry (either GPS receiver 162 or WiFi receiver 188 along with location determination processes) is enabled in user attached monitor device 110, and the location of user attached monitor device 110 is requested (block 315). In addition, motion/proximity sensor 152 of user attached monitor device 110 is enabled and motion information is requested from user attached monitor device 110 (block 320).

A delay period is allowed to pass to give user attached monitor device 110 sufficient time to determine the location of user attached monitor device 110 and to establish whether user attached monitor device 110 is moving (block 325). During this time, the respective circuitry of user attached monitor device 110 operates to determine the requested location and motion information. Once the time period has passed (block 325), the location and motion information determined by user attached monitor device 110 is received from user attached monitor device 110 (block 330). Where user detached monitor device 120 is the master in the diagnostic process, the results may be communicated to user detached monitor device 120 via communication between local communication link 181 of user detached monitor device 120 and local communication link 159 of user attached monitor device 110. Alternatively, where central monitoring station 160 is the master in the diagnostic process, the results may be communicated to central monitoring station 160 via wide area network 150 over either WiFi or cellular communication links.

In parallel to blocks 310-330, a request to delay is provided to user detached monitor device 120 along with a request for a response as to whether the communication request of block 310 was completed by user attached monitor device 110 via a combination of local communication link 159 and local communication link 181 (block 340). The delay period is sufficient to allow user attached monitor device 110 to receive the request of block 310 and to respond.

In addition, location determination circuitry (location detection circuit 126 along with location determination processes) is enabled in user detached monitor device 120, and the location of user detached monitor device 120 is requested (block 345). In addition, motion detector 111 of user detached monitor device 120 is enabled and motion information is requested from user detached monitor device 120 (block 350).

A delay period is allowed to pass to give user detached monitor device 120 sufficient time to determine the location of user detached monitor device 120 and to establish whether user detached monitor device 120 is moving (block 355). During this time, the respective circuitry of user attached monitor device 110 operates to determine the requested location and motion information. Once the time period has passed (block 325), the location and motion information determined by user detached monitor device 120 is received from user detached monitor device 120 (block 360). Where user detached monitor device 120 is the master in the diagnostic process, the results are received from a module (software, hardware, or combination thereof) within user detached monitor device 120. Alternatively, where central monitoring station 160 is the master in the diagnostic process, the results may be communicated to central monitoring station 160 via wide area network 150 over either WiFi or cellular communication links.

A combination of whether communication via the local communication links was requested by user attached monitor device 110, and the location and motion information from both user attached monitor device 110 and user detached monitor device 120 is analyzed to determine whether a received tamper indication is spurious (block 370). Block 370 is shown in dashed lines as the analysis is shown in greater detail in flow diagram 371 which is discussed in more detail below in relation to FIG. 3*b*.

Where user detached monitor device 120 is the master in the diagnostic process, either user detached monitor device 120 or central monitor station 160 may perform the analysis. Where central monitor station 160 is providing the analysis and user detached monitor device 120 is the master in the diagnostic process, user detached monitor device 120 transmits the combination of the results from the user attached monitor device 110 and user detached monitor device 120 to the central monitor station 160 via wide area network 150. Alternatively, where central monitoring station 160 is the master in the diagnostic process, central monitor station 160 receives individual results from both of user detached monitor device 120 and user attached monitor device 110 and performs the analysis.

Ultimately, the results of the analysis are reported (block 395). Depending upon, for example, the urgency of the selected diagnostic test, reporting the results may be an immediate electronic message to a monitor (e.g., parole office charged with monitoring the individual to which the user attached monitor device is attached), or may result in recording the results in a database. Based upon the disclosure provided herein, one of ordinary skill in the art will recognize a variety of reporting processes, recipients, and/or storage locations for the results.

Turning to FIG. 3b, flow diagram 371 shows an example analysis of block 370 that may be performed in relation to one or more embodiments. Following flow diagram 371, proximity results indicating the proximity of user attached monitor device 110 to the limb of the individual to which user attached monitor device 110 is supposed to be attached are received from motion/proximity sensor 152 of user attached monitor device 110 (block 302). Again, where where user detached monitor device 120 is the master in the diagnostic process, the results are received from a module (software, hardware, or combination thereof) within user detached monitor device 120. Alternatively, where central monitoring station 160 is the master in the diagnostic process, the results may be communicated to central monitoring station 160 from user attached monitor device 110 via wide area network 150 over either WiFi or cellular communication links.

It is determined whether the proximity results received from user attached monitor device 110 indicate that user attached monitor device is within a defined proximity of a limb of the individual to which user attached monitor device 110 is supposed to be attached (block 304). Where the proximity results indicate that user attached monitor device 110 is not within the defined proximity (block 304), it is likely that a previously received tamper from user attached monitor device 110 was not spurious as it appears that the tamper resulted in removal of user attached monitor device 110 from the limb (block 318).

Alternatively, where the proximity results indicate that user attached monitor device 110 is still within the defined proximity (block 304), it is determined whether the communication request of block 310 was received by user detached monitor device 120 (block 306). Where the communication request was not received (block 306), it is determined whether the location information from the user attached monitor device 110 and the location information from the user detached monitor device 120 indicate that user attached monitor device 110 and user detached monitor device 120 are within a preset distance of each other (block 308). Where user attached monitor device 110 and user detached monitor device 120 are not within a preset distance of each other (block 308), it is likely that a previously received tamper from user attached monitor device 110 was not spurious as it appears that the tamper resulted in removal of user attached monitor device 110 from the limb (block 318).

Alternatively, where user attached monitor device 110 and user detached monitor device 120 are within a preset distance of each other (block 308), the motion information received from user attached monitor device 110 and the motion information from user detached monitor device 120 is used to determine whether both user attached monitor device 110 and user detached monitor device 120 are moving (block 312). Where it is determined that user attached monitor device 110 and user detached monitor device 120 are not both moving (block 312), it is determined whether both user attached monitor device 110 and user detached monitor device 120 are moving (block 314). Where one of user attached monitor device 110 or user detached monitor device 120 is moving and the other of user attached monitor device 110 and user detached monitor device 120 is not moving (i.e., user attached monitor device 110 and user detached monitor device 120 are not both non-moving) (block 314), it is likely that a previously received tamper from user attached monitor device 110 was not spurious as it appears that the tamper resulted in removal of user attached monitor device 110 from the limb (block 318).

Alternatively, where both user attached monitor device 110 and user detached monitor device 120 are not moving (block 314) or both user attached monitor device 110 and user detached monitor device 120 are moving (block 312), it is likely that a previously received tamper from user attached monitor device 110 was spurious (block 316).

Figure 4A:
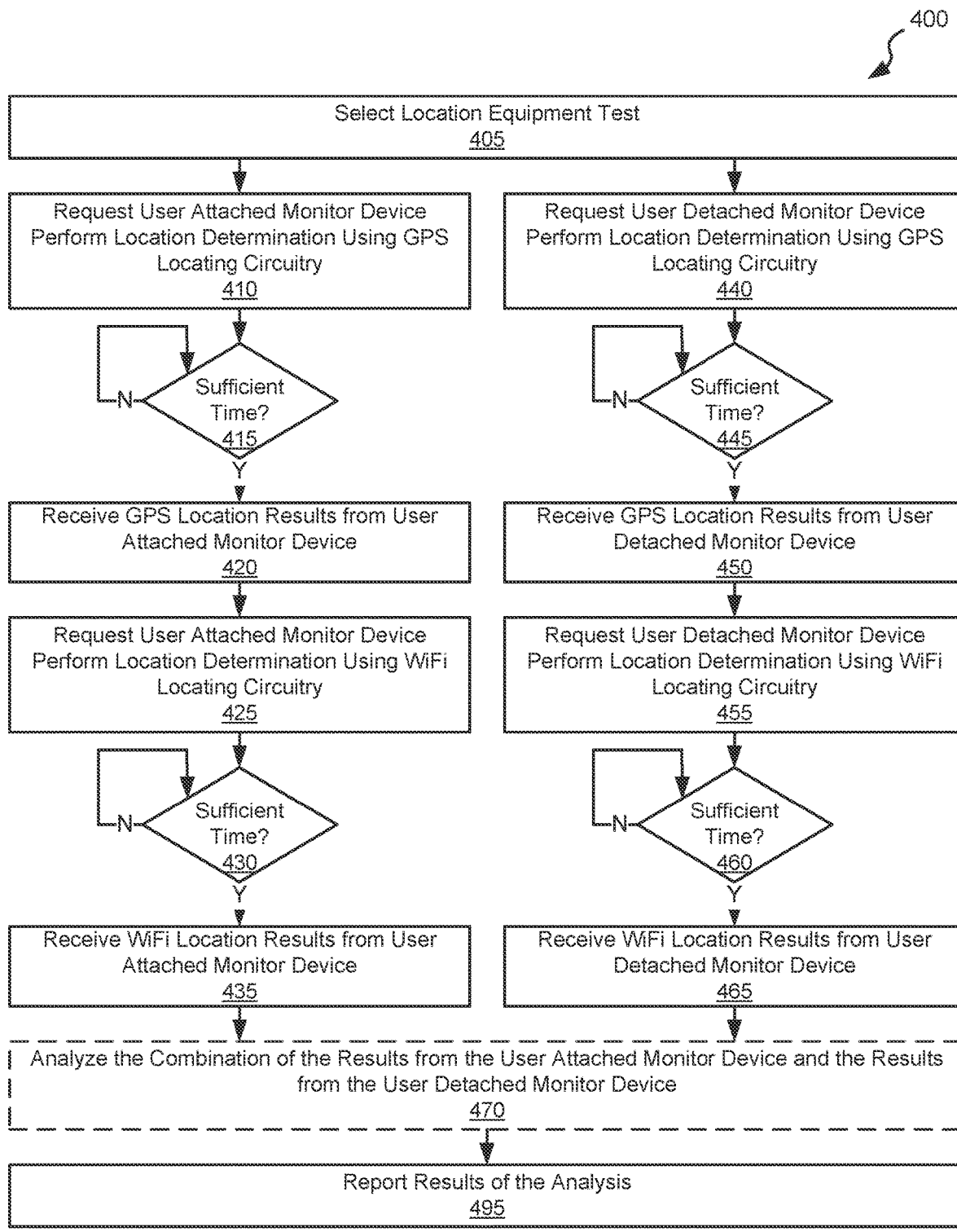
FIGS. 4a-4b are flow diagrams showing a method in accordance with some embodiments for using a combination of a user detached monitor device and a user attached monitor device to determine operational status of location circuitry in one or both of the user detached monitor device and/or the user attached monitor device.
Figure 4B:
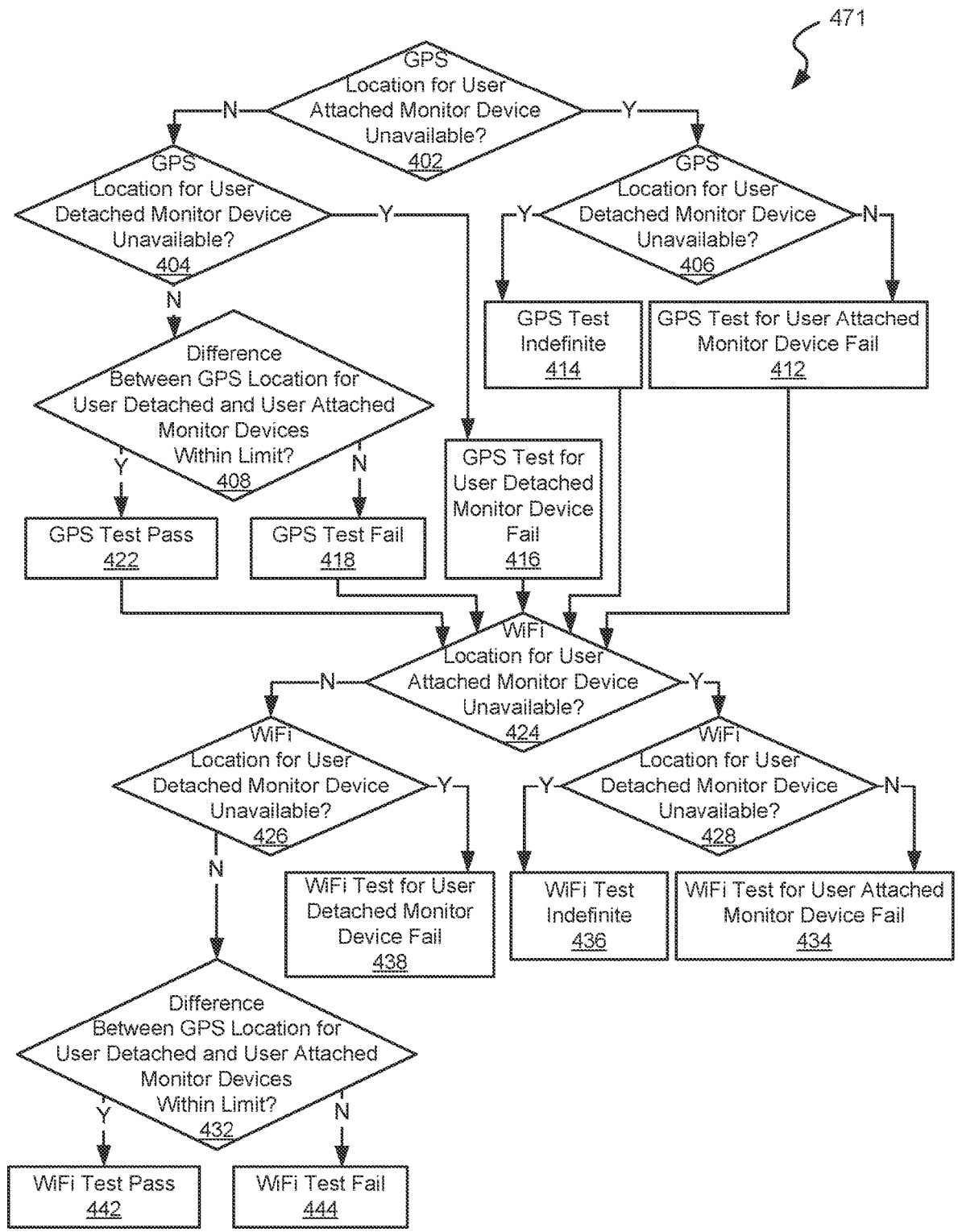

Turning to FIGS. 4a-4b, flow diagrams 400, 471 show a method in accordance with some embodiments for using a combination of user detached monitor device 120 and a user attached monitor device 110 to determine operational status of location circuitry (location detection circuitry 126 of user detached monitor device 120 and/or GPS receiver 162 or WiFi location ability using WiFi receiver 188 of user attached monitor device 110) in one or both of the user detached monitor device 120 and/or the user attached monitor device 110. Following flow diagram 400, a location equipment test is selected (block 405). This selected diagnostic test is designed to test whether location functionality including location circuitry in user attached monitor device 110 and user detached monitor device 120 is operating acceptably.

A command to request that the user attached monitor device 110 perform location determination using GPS locating circuitry (e.g., GPS receiver 162) is provided to user attached monitor device 110 (block 410). Where user detached monitor device 120 is the master in the diagnostic process, the command to determine location may be provided from user detached monitor device 120 via local communication link 159 and local communication link 181 under the direction of diagnosis application 199. Alternatively, where central monitoring station 160 is the master in the diagnostic process, the command to determine location is communicated to user attached monitor device 110 by central monitoring station 160 via wide area network 150 over either WiFi or cellular communication links.

A delay period is allowed to pass to give user attached monitor device 110 sufficient time to determine the GPS based location of user attached monitor device 110 (block 415). During this time, the respective circuitry of user attached monitor device 110 operates to determine the requested location information. Once the time period has passed (block 415), the GPS location information determined by user attached monitor device 110 is received from user attached monitor device 110 (block 420).

A command to request that user attached monitor device 110 perform location determination using WiFi locating circuitry (e.g., WiFi receiver 188) is provided to user attached monitor device 110 (block 425). Again, where user detached monitor device 120 is the master in the diagnostic process, the command to determine location may be provided from user detached monitor device 120 via local communication link 159 and local communication link 181 under the direction of diagnosis application 199. Alternatively, where central monitoring station 160 is the master in the diagnostic process, the command to determine location is communicated to user attached monitor device 110 by central monitoring station 160 via wide area network 150 over either WiFi or cellular communication links.

A delay period is allowed to pass to give user attached monitor device 110 sufficient time to determine the WiFi based location of user attached monitor device 110 (block 430). During this time, the respective circuitry of user attached monitor device 110 operates to determine the requested location information. Once the time period has passed (block 430), the WiFi location information determined by user attached monitor device 110 is received from user attached monitor device 110 (block 435).

In parallel to blocks 410-435, a command to request that the user detached monitor device 120 perform location determination using GPS locating circuitry (e.g., GPS functionality of location detection circuit 126) is provided to user detached monitor device 120 (block 440). In some embodiments, this command is maintained in diagnosis application 199 and is requested by central monitoring station 160 via wide area network 150 over either WiFi or cellular communication links.

A delay period is allowed to pass to give user detached monitor device 120 sufficient time to determine the GPS based location of user detached monitor device 120 (block 445). During this time, the respective circuitry of user detached monitor device 120 operates to determine the requested location information. Once the time period has passed (block 445), the GPS location information determined by user detached monitor device 120 is received from user detached monitor device 120 (block 450). Where user detached monitor device 120 is the master in the diagnostic process, the results are received from a module (software, hardware, or combination thereof) within user detached monitor device 120. Alternatively, where central monitoring station 160 is the master in the diagnostic process, the results may be communicated to central monitoring station 160 via wide area network 150 over either WiFi or cellular communication links.

A command to request that user detached monitor device 120 perform location determination using WiFi locating circuitry (e.g., WiFi functionality of location detection circuit 126) is provided to user detached monitor device 120 (block 455). In some embodiments, this command is maintained in diagnosis application 199 and is requested by central monitoring station 160 via wide area network 150 over either WiFi or cellular communication links.

A delay period is allowed to pass to give user detached monitor device 120 sufficient time to determine the WiFi based location of user detached monitor device 120 (block 460). During this time, the respective circuitry of user detached monitor device 120 operates to determine the requested location information. Once the time period has passed (block 460), the WiFi location information determined by user detached monitor device 120 is received from user detached monitor device 120 (block 465). Where user detached monitor device 120 is the master in the diagnostic process, the results are received from a module (software, hardware, or combination thereof) within user detached monitor device 120. Alternatively, where central monitoring station 160 is the master in the diagnostic process, the results may be communicated to central monitoring station 160 via wide area network 150 over either WiFi or cellular communication links.

A combination of the GPS location information and the WiFi location information from both user attached monitor device 110 and user detached monitor device 120 is analyzed (block 470). Block 470 is shown in dashed lines as the analysis is shown in greater detail in flow diagram 471 which is discussed in more detail below in relation to FIG. 4b.

Where user detached monitor device 120 is the master in the diagnostic process, either user detached monitor device 120 or central monitor station 160 may perform the analysis. Where central monitor station 160 is providing the analysis and user detached monitor device 120 is the master in the diagnostic process, user detached monitor device 120 transmits the combination of the results from the user attached monitor device 110 and user detached monitor device 120 to the central monitor station 160 via wide area network 150. Alternatively, where central monitoring station 160 is the master in the diagnostic process, central monitor station 160 receives individual results from both of user detached monitor device 120 and user attached monitor device 110 and performs the analysis.

Ultimately, the results of the analysis are reported (block 495). Depending upon, for example, the urgency of the selected diagnostic test, reporting the results may be an immediate electronic message to a monitor (e.g., parole office charged with monitoring the individual to which the user attached monitor device is attached), or may result in recording the results in a database. Based upon the disclosure provided herein, one of ordinary skill in the art will recognize a variety of reporting processes, recipients, and/or storage locations for the results.

Turning to FIG. 4b, flow diagram 471 shows an example analysis of block 470 that may be performed in relation to one or more embodiments. Following flow diagram 471, it is determined whether the GPS location information for user attached monitor device 110 is unavailable (block 402). Such GPS location information may be unavailable where, for example, either GPS receiver 162 is not functioning or where user attached monitor device 110 is at a location where it cannot receive information from GPS satellites 145. Where GPS location information is not available from user attached monitor device 110 (block 402), it is determined whether GPS location information is unavailable for user detached monitor device 120 (block 406). Where GPS location information is unavailable for user attached monitor device 110 (block 402) and unavailable for user detached monitor device 120 (block 406), it is determined that the GPS location test results are indefinite as it appears that the unavailability is due to an inability to receive GPS signals at the location where both user attached monitor device 110 and user detached monitor device 120 are located (block 414). Alternatively, where GPS location information is unavailable for user attached monitor device 110 (block 402), but is available for user detached monitor device 120 (block 406), it is determined that the GPS location test for the user attached monitor device 110 was a fail because GPS signals appear to be available at the location where both user attached monitor device 110 and user detached monitor device 120 are located, but user attached monitor device 110 failed to properly receive and/or properly process the available signals (block 412).

Alternatively, where GPS location information is available from user attached monitor device 110 (block 402), it is determined whether GPS location information is unavailable for user detached monitor device 120 (block 404). Where GPS location information is available for user attached monitor device 110 (block 402), but unavailable for user detached monitor device 120 (block 404), it is determined that the GPS location test for the user detached monitor device 120 was a fail because GPS signals appear to be available at the location where both user attached monitor device 110 and user detached monitor device 120 are located, but user detached monitor device 120 failed to properly receive and/or properly process the available signals (block 416).

Where, on the other hand, GPS location information is available for both user attached monitor device 110 (block 402) and for user detached monitor device 120 (block 404), the GPS location information from both user attached monitor device 110 and user detached monitor device 120 is compared to determine whether the difference between the reported location of user attached monitor device 110 and user detached monitor device 120 is within a defined threshold (block 408). Where the difference in the reported GPS locations is within a defined distance (block 408), the GPS location test passes for both user attached monitor device 110 and user detached monitor device 120 (block 422). Otherwise, the GPS location test fails for both user attached monitor device 110 and user detached monitor device 120 (block 418).

It is determined whether the WiFi location information for user attached monitor device 110 is unavailable (block 424). Such WiFi location information may be unavailable where, for example, either WiFi receiver 188 is not functioning or where user attached monitor device 110 is at a location where it cannot receive information from signals from WiFi access points 187. Where WiFi location information is not available from user attached monitor device 110 (block 424), it is determined whether WiFi location information is unavailable for user detached monitor device 120 (block 428). Where WiFi location information is unavailable for user attached monitor device 110 (block 402) and unavailable for user detached monitor device 120 (block 406), it is determined that the WiFi location test results are indefinite as it appears that the unavailability is due to an inability to receive WiFi signals at the location where both user attached monitor device 110 and user detached monitor device 120 are located (block 436). Alternatively, where WiFi location information is unavailable for user attached monitor device 110 (block 424), but is available for user detached monitor device 120 (block 428), it is determined that the WiFi location test for the user attached monitor device 110 was a fail because WiFi signals appear to be available at the location where at the location where both user attached monitor device 110 and user detached monitor device 120 are located, but user attached monitor device 110 failed to properly receive and/or properly process the available signals (block 434).

Alternatively, where WiFi location information is available from user attached monitor device 110 (block 424), it is determined whether WiFi location information is unavailable for user detached monitor device 120 (block 426). Where WiFi location information is available for user attached monitor device 110 (block 424), but unavailable for user detached monitor device 120 (block 426), it is determined that the WiFi location test for the user detached monitor device 120 was a fail because WiFi signals appear to be available at the location where at the location where both user attached monitor device 110 and user detached monitor device 120 are located, but user detached monitor device 120 failed to properly receive and/or properly process the available signals (block 438).

Where, on the other hand. WiFi location information is available for both user attached monitor device 110 (block 424) and for user detached monitor device 120 (block 428), the WiFi location information from both user attached monitor device 110 and user detached monitor device 120 is compared to determine whether the difference between the reported location of user attached monitor device 110 and user detached monitor device 120 is within a defined threshold (block 432). Where the difference in the reported WiFi locations is within a defined distance (block 432), the WiFi location test passes for both user attached monitor device 110 and user detached monitor device 120 (block 442). Otherwise, the WiFi location test fails for both user attached monitor device 110 and user detached monitor device 120 (block 444).

Figure 5:
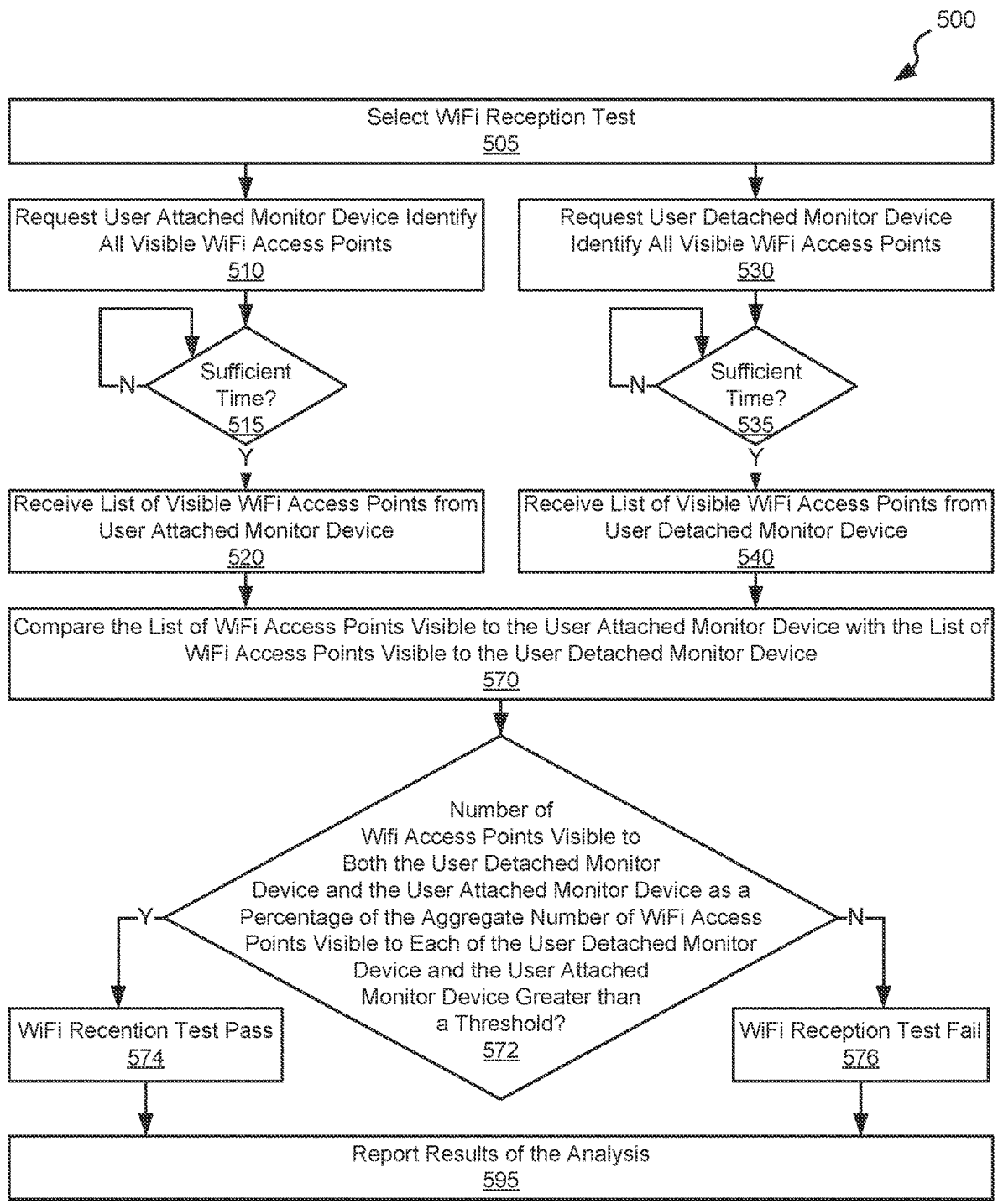
FIG. 5 is a flow diagram showing a method in accordance with some embodiments for using a combination of a user detached monitor device and a user attached monitor device to diagnose operational status of WiFi functionality of one or both of the user detached monitor device and/or the user attached monitor device.

Turning to FIG. 5, a flow diagram 500 shows a method in accordance with some embodiments for using a combination of user detached monitor device 120 and user attached monitor device 110 to diagnose operational status of WiFi functionality of one or both of the user detached monitor device 120 and/or the user attached monitor device 110. Following flow diagram 500, a WiFi reception test is selected (block 505). This selected diagnostic test is designed to test whether WiFi receiving functionality including WiFi receiver 188 of user attached monitor device 110 and WiFi capability of wireless transceiver of user detached monitor device 120 is operating properly.

A command to request that the user attached monitor device 110 identify all WiFi access points 187 visible to WiFi receiver 188 is provided to user attached monitor device 110 (block 510). Where user detached monitor device 120 is the master in the diagnostic process, the command to determine WiFi reception may be provided from user detached monitor device 120 via local communication link 159 and local communication link 181 under the direction of diagnosis application 199. Alternatively, where central monitoring station 160 is the master in the diagnostic process, the command to determine WiFi reception is communicated to user attached monitor device 110 by central monitoring station 160 via wide area network 150 over either WiFi or cellular communication links.

A delay period is allowed to pass to give user attached monitor device 110 sufficient time to determine all WiFi access points 187 visible to user attached monitor device 110 (block 515). During this time, the respective circuitry of user attached monitor device 110 operates to prepare a list of all visible WiFi access points. Once the time period has passed (block 515), the list of visible WiFi access points is received from user attached monitor device 110 (block 520).

In parallel to blocks 510-520, a command to request that the user detached monitor device 120 identify all WiFi access points 187 visible to wireless transceiver circuitry 128 is provided to user detached monitor device 120 (block 530). In some embodiments, this command is maintained in diagnosis application 199 and is requested by central monitoring station 160 via wide area network 150 over either WiFi or cellular communication links.

A delay period is allowed to pass to give user detached monitor device 120 sufficient time to determine all WiFi access points 187 visible to user detached monitor device 120 (block 535). During this time, the respective circuitry of user detached monitor device 120 operates to prepare a list of all visible WiFi access points. Once the time period has passed (block 535), the list of visible WiFi access points is received from user detached monitor device 120 (block 540).

The list of WiFi access points visible to user attached monitor device 110 is compared with the list of WiFi access points visible to user detached monitor device 120 (block 570). It is determined whether the number of WiFi access points visible to both user attached monitor device 110 and user detached monitor device 120 as a percentage of the sum of the number of WiFi access points visible to at least one of user attached monitor device 110 and user detached monitor device 120 is greater than a predefined threshold value (block 572). Where the percentage of Wifi Access points visible to both user attached monitor device 110 and user detached monitor device 120 is greater than the predefined threshold value (block 572), it is determined that the WiFi reception test passes (block 574). Otherwise, where the percentage of Wifi Access points visible to both user attached monitor device 110 and user detached monitor device 120 is not greater than the predefined threshold value (block 572), it is determined that the WiFi reception test fails (block 576). The result of the WiFi reception test is reported (block 595). Depending upon, for example, the urgency of the selected diagnostic test, reporting the results may be an immediate electronic message to a monitor (e.g., parole office charged with monitoring the individual to which the user attached monitor device is attached), or may result in recording the results in a database. Based upon the disclosure provided herein, one of ordinary skill in the art will recognize a variety of reporting processes, recipients, and/or storage locations for the result.

Figure 6:
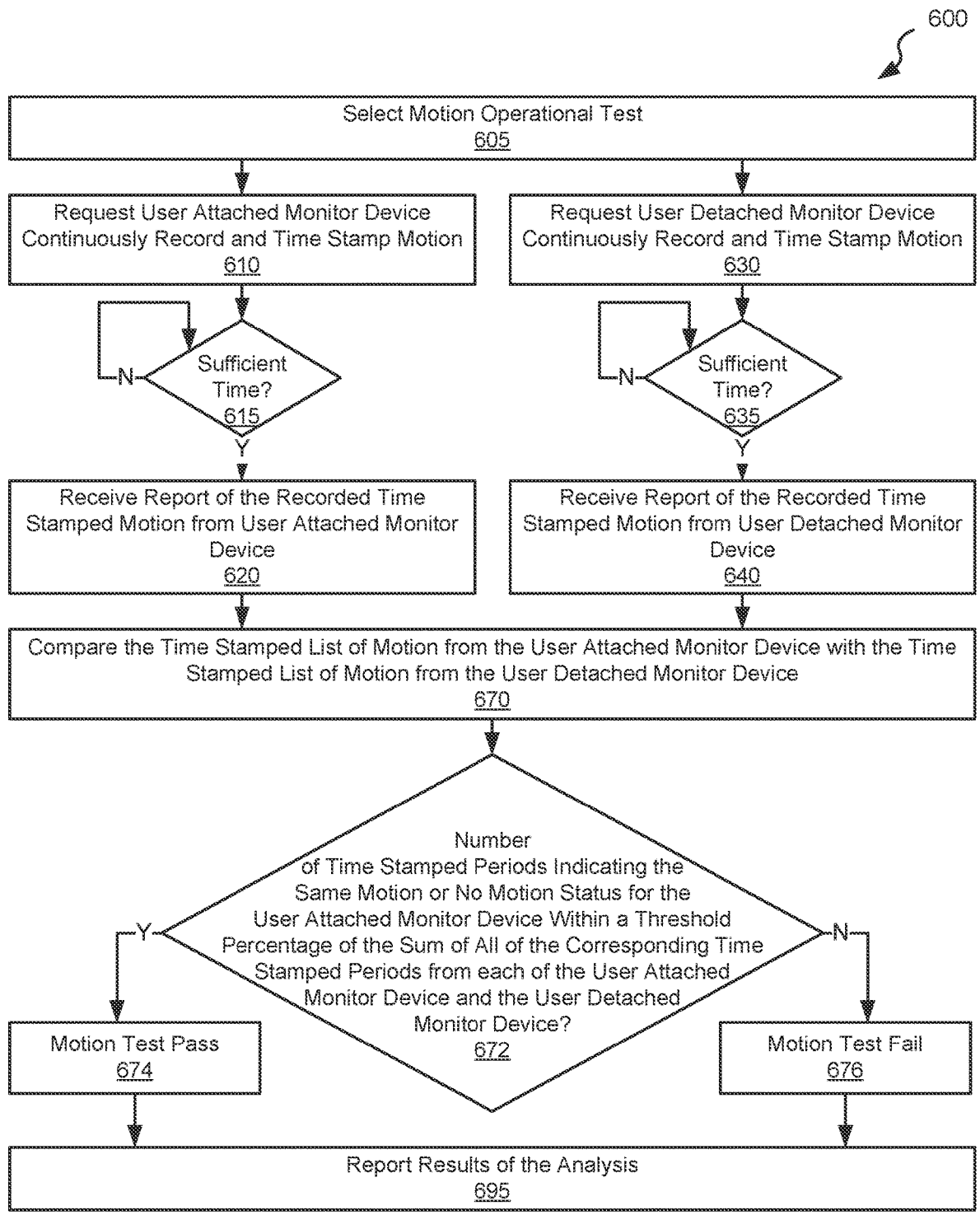
FIG. 6 is a flow diagram showing a method in accordance with some embodiments for using a combination of a user detached monitor device and a user attached monitor device to diagnose operational status of motion detection functionality of one or both of the user detached monitor device and/or the user attached monitor device.

Turning to FIG. 6, a flow diagram 600 shows a method in accordance with some embodiments for using a combination of user detached monitor device 120 and user attached monitor device 110 to diagnose operational status of motion detection functionality of one or both of the user detached monitor device 120 and/or the user attached monitor device 110. Following flow diagram 600, a motion operational test is selected (block 605). This selected diagnostic test is designed to test whether motion detection functionality including motion/proximity sensor 152 of user attached monitor device 110 and motion detector 111 of user detached monitor device 120 is operating properly.

A command to request that user attached monitor device 110 continuously record and time stamp motion information from motion/proximity sensor 152 is provided to user attached monitor device 110 (block 610). Where user detached monitor device 120 is the master in the diagnostic process, the command to determine motion may be provided from user detached monitor device 120 via local communication link 159 and local communication link 181 under the direction of diagnosis application 199. Alternatively, where central monitoring station 160 is the master in the diagnostic process, the command to determine motion is communicated to user attached monitor device 110 by central monitoring station 160 via wide area network 150 over either WiFi or cellular communication links.

A delay period is allowed to pass to give user attached monitor device 110 sufficient time to provide a time stamped list of motion detection (block 615). In some embodiments, the time period is fifteen minutes. Based upon the disclosure provided herein, one of ordinary skill in the art will recognize other suitable time periods. During this time, the respective circuitry of user attached monitor device 110 operates to prepare a time stamped list of detected motion and non-motion. Once the time period has passed (block 615), the time stamped list of detected motion and non-motion is received from user attached monitor device 110 (block 620).

In parallel to blocks 610-620, a command to request that user detached monitor device 120 continuously record and time stamp motion information from motion detector 111 is provided to user detached monitor device 120 (block 630). In some embodiments, this command is maintained in diagnosis application 199 and is requested by central monitoring station 160 via wide area network 150 over either WiFi or cellular communication links.

A delay period is allowed to pass to give user attached monitor device 110 sufficient time to provide a time stamped list of motion detection (block 635). In some embodiments, the time period is fifteen minutes. Based upon the disclosure provided herein, one of ordinary skill in the art will recognize other suitable time periods. During this time, the respective circuitry of user detached monitor device 120 operates to prepare a time stamped list of detected motion and non-motion. Once the time period has passed (block 635), the time stamped list of detected motion and non-motion is received from user detached monitor device 120 (block 640).

The time stamped list of motion from user attached monitor device 110 is compared with the time stamped list of motion from user detached monitor device 120 (block 670). This comparison includes aligning time stamps and comparing only entries in the respective lists with similar time stamps. It is determined whether the number of periods indicating motion (i.e., similar time stamps with corresponding motion entries) reported by both user attached monitor device 110 and user detached monitor device 120 as a percentage of the sum of the number of corresponding periods in the respective lists from each of user attached monitor device 110 and user detached monitor device 120 is greater than a predefined threshold value (block 672). Where the percentage of motion indication for both user attached monitor device 110 and user detached monitor device 120 is greater than a sum of all of the corresponding periods (i.e., similar time stamp points occurring in data received from both user attached monitor device 110 and user detached monitor device 120) is greater than a predefined threshold value (block 672), it is determined that the motion operational test passes (block 674). Otherwise, where the percentage is not greater than the predefined threshold value (block 672), it is determined that the the motion operational test fails (block 676). The result of the WiFi reception test is reported (block 695). Depending upon, for example, the urgency of the selected diagnostic test, reporting the results may be an immediate electronic message to a monitor (e.g., parole office charged with monitoring the individual to which the user attached monitor device is attached), or may result in recording the results in a database. Based upon the disclosure provided herein, one of ordinary skill in the art will recognize a variety of reporting processes, recipients, and/or storage locations for the result.

In conclusion, the present invention provides for novel systems, devices, and methods for diagnosing operational status of devices and/or software in a monitoring system. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for determining operation status of a monitoring system, the method comprising:
    receiving a first test result derived from a first user monitor device, wherein the user first monitor device is associated with an individual being monitored, and wherein the first test result is generated by executing a first test command by the first user monitor device;
    transmitting a second test command to a second user monitor device, wherein the second user monitor device is associated with the individual being monitored;
    executing the second test command by the second user monitor device to yield a second test result;
    receiving the second test result corresponding to the second test command; and
    analyzing a combination of the first test result and the second test result to determine an operation status of at least one of the user attached monitor device and the user detached monitor device.

2. The method of claim 1, wherein the first user monitor device is physically attached to the individual being monitored.

3. The method of claim 1, wherein the analyzing is performed by a central monitoring station, the method further comprising:
reporting an analysis result derived from analyzing the combination of the first test result and the second test result, wherein the analysis result is reported from the monitoring station to at least one entity involved in monitoring the individual being monitored.

4. The method of claim 3, wherein the second user monitoring device is a user detached monitoring device, and wherein the analyzing is performed by the user detached monitor device, the method further comprising:
reporting an analysis result derived from analyzing the combination of the first test result and the second test result, wherein the analysis result is reported from the user detached monitor device to at least one entity involved in monitoring the individual via the central monitoring station.

5. The method of claim 1, wherein the first user monitor device is a user attached monitor device physically attached to the individual being monitored and the second user monitor device is a user detached monitor device, the method further comprising:
the first test command commands the user attached monitor device to determine location of the user attached monitor device;
the first test result is selected from a group consisting of: a location of the user attached monitor device, and a location unavailable message;
the second test command commands the user detached monitor device to determine location of the user detached monitor device;
the second test result is selected from a group consisting of: a location of the user detached monitor device, and a location unavailable message; and
analyzing the combination of the first test result and the second test result includes utilizing both the first test result and the second test result to determine an analysis result indicating at least one of: a user attached location test fail, a user detached location test fail, a location test indefinite, a user attached location test pass, or a user detached location test pass.

6. A system for determining operation status of a monitoring system, the system comprising:
a first user monitor device associated with an individual being monitored, and wherein the first user monitor device is configured to:
execute a first test command to yield a first test result;
a second user monitor device associated with the individual being monitored, and wherein the second user monitor device is configured to:
execute a second test command to yield a second test result;
a processor and a non-transient computer readable medium, wherein the non-transient computer readable medium includes instructions executable by the processor analyze a combination of the first test result and the second test result to determine an operation status of at least one of the first user monitor device and the second user monitor device.

7. The system of claim 6, wherein the first monitor device is a user attached monitor device that is physically attached to the individual being monitored.

8. The system of claim 6, wherein the first user monitor device comprises:
location determination circuitry; and
a strap for attaching the first user monitor device to the individual being monitored.

9. The system of claim 6, wherein the second user monitor device comprises:
location determination functionality.

10. The system of claim 6, wherein the processor is part of a monitoring station located remote from both the first user monitor device and the second user monitor device, wherein the first user monitor device includes a first transmitter, wherein the second user monitor device includes a second transmitter, and wherein:
the first user monitor device is further configured to transmit the first test result to the monitoring station using the first transmitter; and
the second user monitor device is further configured to transmit the second test result to the monitoring station using the second transmitter.

11. The system of claim 10, wherein the monitoring station is further configured to:
transmit the first test command to the user attached monitor device.

12. The system of claim 10, wherein the monitoring station is further configured to:
transmit the second test command to the user detached monitor device.

13. The system of claim 6, wherein the second user monitor device is a wireless communication device.

14. The system of claim 6, wherein the computer readable medium further includes instructions executable by the processor to:
report an analysis result derived from analyzing the combination of the first test result and the second test result, wherein the analysis result is reported from the monitoring station to at least one entity involved in monitoring the individual.

15. A system for determining operation status of a monitoring system, the system comprising:
a first monitoring device associated with a user, wherein the first monitoring device includes a first processor and a first non-transient computer readable medium, and wherein the first non-transient computer readable medium includes instructions executable by the first processor to:
receive a request to perform a first test;
perform the first test to yield a first test result;
a second monitoring device associated with the user, wherein the second monitoring device includes a second processor and a second non-transient computer readable medium, and wherein the second non-transient computer readable medium includes instructions executable by the second processor to:
receive a request to perform a second test;
perform the first test to yield a second test result;
a monitoring system remote from both the first monitor device and the second monitor device, wherein the third monitoring device includes a third processor and a third non-transient computer readable medium, and wherein the third non-transient computer readable medium includes instructions executable by the third processor to:
receive the first test result;
receive the second test result; and
analyze a combination of the first test result and the second test result to determine an operation status of at least one of the user attached monitor device and the user detached monitor device.

16. The system of claim 15, wherein the first monitoring device is a user attached monitor device that includes:
- location determination circuitry; and
- a strap for attaching the user attached monitor device to the individual being monitored.

17. The system of claim 16, wherein the second monitor device is a user detached monitor device that includes:
- location determination functionality.

18. The system of claim 15, wherein the first monitor device includes a first transmitter configured to transmit the first test result to the monitoring station using the first transmitter, and wherein the second monitor device includes a second transmitter transmit the second test result to the monitoring station using the second transmitter.

19. The system of claim 15, wherein the third computer readable medium further includes instructions executable by the third processor to:
- transmit the first test command to the first monitor device.

20. The system of claim 15, wherein the third computer readable medium further includes instructions executable by the third processor to:
- transmit the second test command to the second monitor device.

\* \* \* \* \*